US011261831B2

(12) United States Patent
Morton et al.

(10) Patent No.: US 11,261,831 B2
(45) Date of Patent: Mar. 1, 2022

(54) AIR CLEANER ASSEMBLY

(71) Applicant: Ford Global Technologies, LLC, Dearborn, MI (US)

(72) Inventors: Jeffrey Morton, Royal Oak, MI (US); David Bryan McGeary, Orion, MI (US); Roger Joseph Khami, Troy, MI (US); Robert Boyer, Livonia, MI (US); Scott Allen Schaffer, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 568 days.

(21) Appl. No.: 16/141,766

(22) Filed: Sep. 25, 2018

(65) Prior Publication Data

US 2020/0095961 A1 Mar. 26, 2020

(51) Int. Cl.
*F02M 35/024* (2006.01)
*B01D 46/00* (2022.01)
*B01D 46/10* (2006.01)

(52) U.S. Cl.
CPC ... *F02M 35/02416* (2013.01); *B01D 46/0005* (2013.01); *B01D 46/10* (2013.01); *B01D 2279/60* (2013.01)

(58) Field of Classification Search
CPC ......... F02M 35/02416; F02M 35/0202; F02M 35/0203; F02M 35/16; B01D 46/0005

USPC ...................................................... 123/198 E
See application file for complete search history.

(56) References Cited

U.S. PATENT DOCUMENTS

| 5,730,768 A | 3/1998 | Kaminaga et al. |
| 6,231,630 B1 * | 5/2001 | Ernst .................. F02M 35/0203 55/385.3 |
| 8,292,983 B2 | 10/2012 | Reichter et al. |
| 8,568,502 B2 | 10/2013 | Khami et al. |
| 2018/0245550 A1 * | 8/2018 | Watanabe ........ F02M 35/02416 |

FOREIGN PATENT DOCUMENTS

DE 4021460 A1 1/1992

OTHER PUBLICATIONS

Morton, J. et al., "Air Cleaner Assembly," U.S. Appl. No. 16/141,819, filed Sep. 25, 2018, 54 pages.

\* cited by examiner

*Primary Examiner* — Lindsay M Low
*Assistant Examiner* — Omar Morales
(74) *Attorney, Agent, or Firm* — Geoffrey Brumbaugh; McCoy Russell LLP

(57) ABSTRACT

An air cleaner assembly including a tray including a cleat receptacle at a back side of the assembly and a cover including a cleat at the back side. The assembly further includes guide features arranged at a front side of the assembly. The guide feature are designed to contact one another continuously and guide the cover rearward, from an unseated position to a fully seated position where the cleat is seated within the cleat receptacle.

17 Claims, 11 Drawing Sheets

AIR CLEANER ASSEMBLY

FIELD

The present description relates generally to an air cleaner assembly with housing alignment features.

BACKGROUND/SUMMARY

An air cleaner (e.g., air filter) assembly is used in an air intake system of an engine of a vehicle in order to filter incoming air prior to combustion. Air cleaner assemblies may be mounted at a front of a vehicle, to a vehicle frame, under a hood of the vehicle. Additionally, an air cleaner assembly may include a clamshell style assembly with a top cover clamped to a bottom tray in order to seal an air filter within the assembly. Due to the close packaging of engine components underneath the vehicle hood, and the clamshell arrangement of the air cleaner assembly, it is possible to miss-install the air cleaner cover so that it is not completely sealed against the tray, thereby resulting in air leaks from the air cleaner assembly.

The inventors herein have recognized additional issues with installing the air cleaner cover on the tray (e.g., after swapping out the air filter, for example). As one example, front clamps on the air cleaner assembly cover may latch to the tray prior to the cover being completely seated within a mating part of the tray, at a back side of the air cleaner assembly. As a result, the air cleaner assembly may leak air. Thus, a technician may have to visually inspect and verify whether the cover of the air cleaner assembly is installed correctly on and sealed against the tray of the air cleaner assembly.

In one example, the issues described above may be addressed by an air cleaner assembly. The air cleaner assembly includes: a tray including a cleat receptacle at a back side of the assembly and a cover including a cleat at the back side. The assembly further includes guide features arranged at a front side of the assembly. The guide features are designed to contact one another continuously and guide the cover rearward, from an unseated position to a seated (e.g., fully seated) position where the cleat is seated within the cleat receptacle.

In this way, the guide features work in conjunction with the cleat receptacle and cleat to direct the tray and the cover into seated alignment which seals the assembly during closure of the assembly. Consequently, the likelihood of improper assembly of the air cleaner is reduced, thereby reducing the likelihood of unwanted air leaks that can lead to intake system degradation, combustion fouling, etc. The durability and longevity of not only the intake system but also the engine are therefore increased, increasing consumer confidence in the vehicle. Furthermore, a technician may forego a step of visual inspection of the assembly's seal during installation, if desired. As such, air filter installation efficiency can also be increased when the tray and cover are guided along a desired path during closure of the assembly.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 5 depicts a side view of the first embodiment of the air cleaner assembly, shown in

FIG. 2.

FIGS. 2-20 are shown approximately to scale. However, other relative dimension may be used, if desired.

DETAILED DESCRIPTION

The following description relates to a housing of an air cleaner (e.g., air filter) deigned to reduce instances of filter misalignment occurring during installation or replacement of the filter body. Structural features of the cleaner's housing guide a tray (also referred to herein as a lower housing) and a cover (also referred to herein as an upper housing) into sealing alignment during housing closure. Sealing the air cleaner in this way reduces (e.g., prevents) unwanted air leakage in the assembly. The likelihood of unwanted particulates traveling into the intake system caused by an improperly installed air cleaner is correspondingly reduced. By reducing the potential of particulates entering the intake system the intake's system longevity is increased along with engine longevity, resulting in an increase in consumer appeal of the vehicle. To achieve the aforementioned benefits the air cleaner may include, for example, guide features at the front of the cleaner. The guide features may, in one embodiment, include ramped surfaces designed to shift the upper housing in a rearward direction to maintain proper alignment during closure of the air cleaner housing. The air cleaner may additionally or alternatively include a pair of cleat receptacles designed to mate with pair of cleats at the back side of the cleaner, to further aid in the alignment between the upper and lower housing during closure of the air cleaner. Specifically, the rearward movement caused by the interaction between members of the guide feature may in turn cause mating engagement between the cleats and cleat receptacles. Additionally, a guide rib in a mounting bracket of the air cleaner may be positioned between the two cleat receptacles and cleats to ensure that the cleats congruently mate with the cleat receptacles during closure. Further, in some examples, the air cleaner may include clamps at the front of an upper section of the housing. The clamps may releasably attach to a lower section of the housing only when the assembly is fully closed. Consequently, the chance of misalignment during air cleaner assembly closure is even further diminished.

Figure 1:
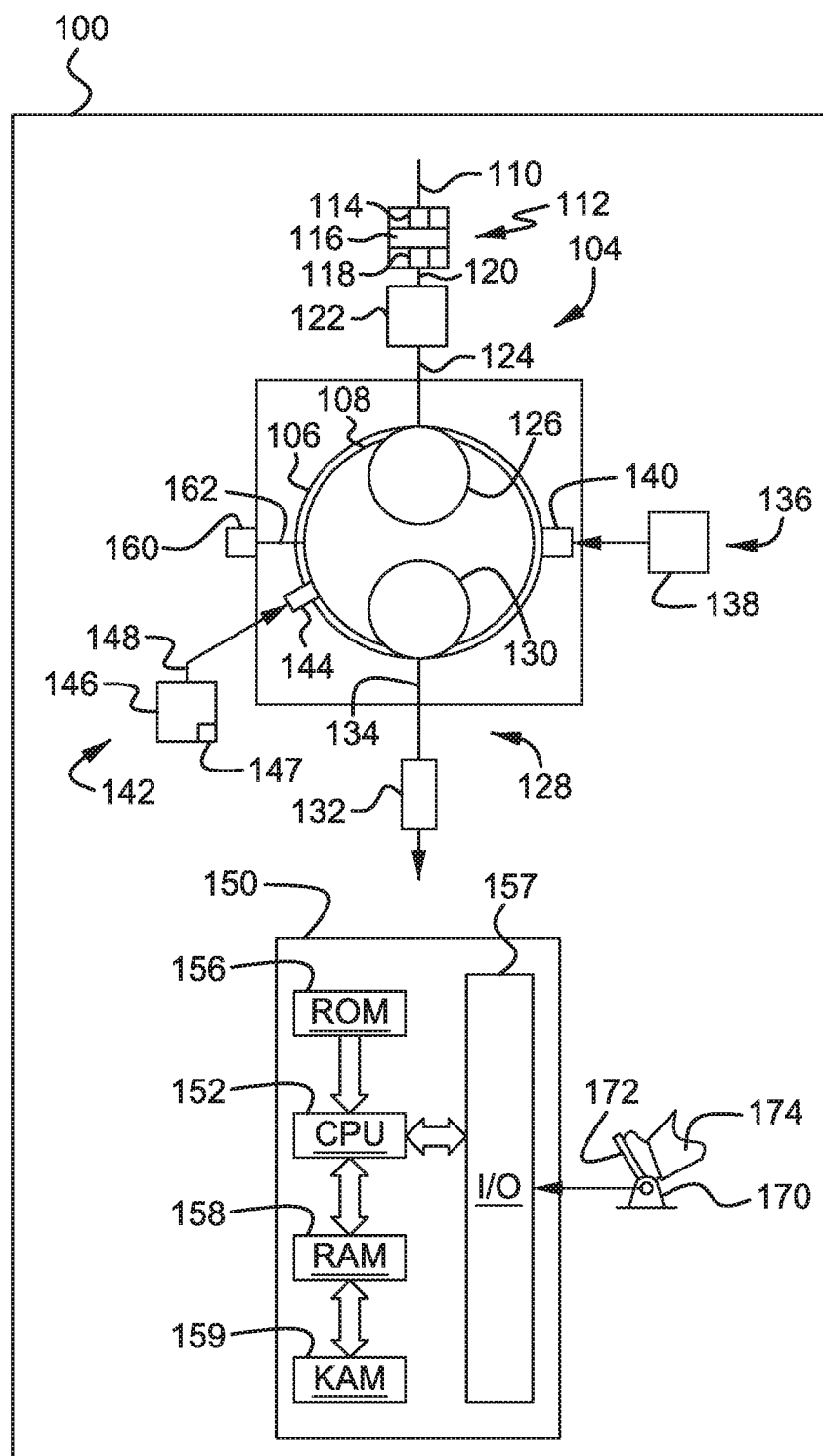
FIG. 1 is a schematic depiction of a vehicle having an engine and intake system with an air cleaner assembly.
Figure 15:
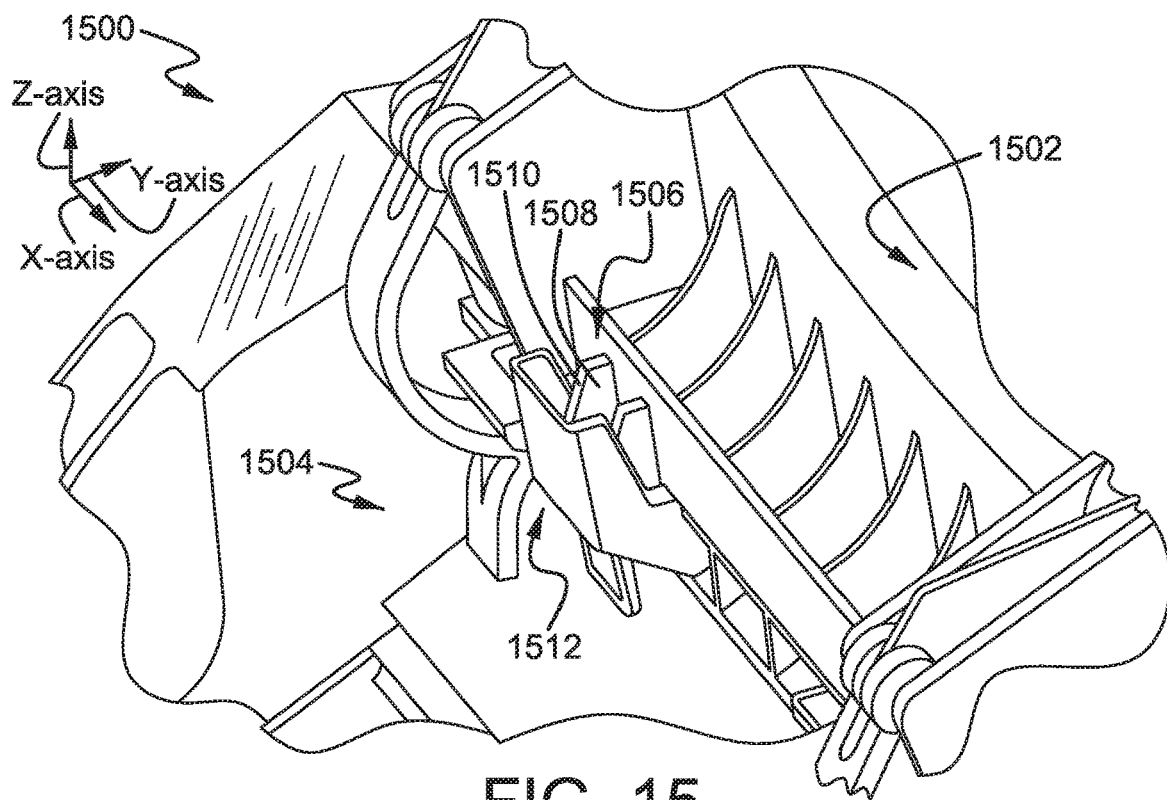
FIGS. 15-16 show a second embodiment of an air cleaner assembly.
Figure 16:
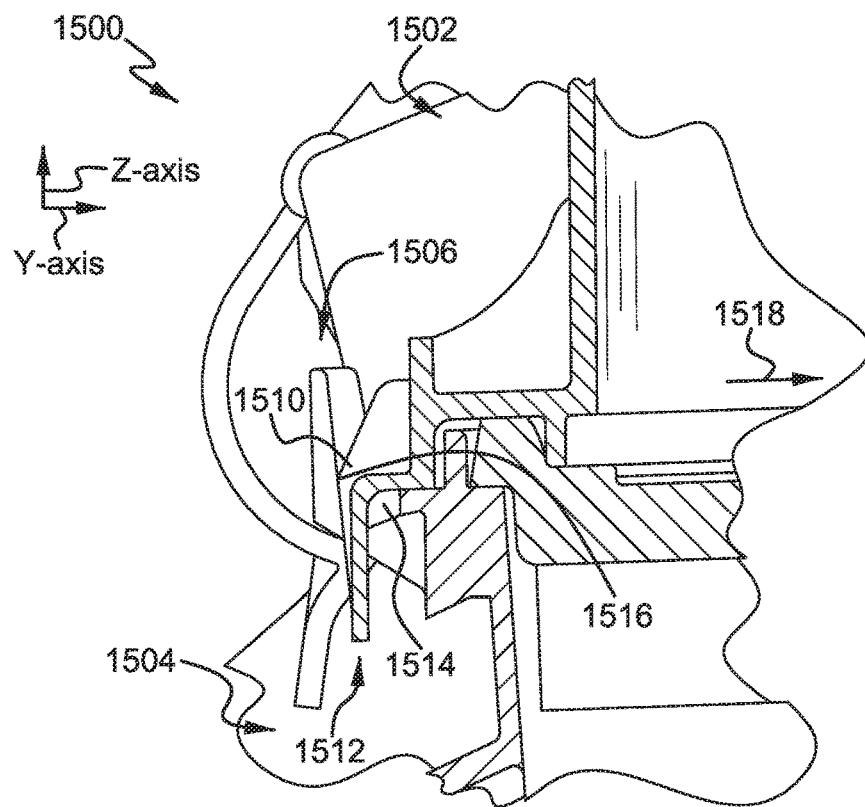
Figure 17:
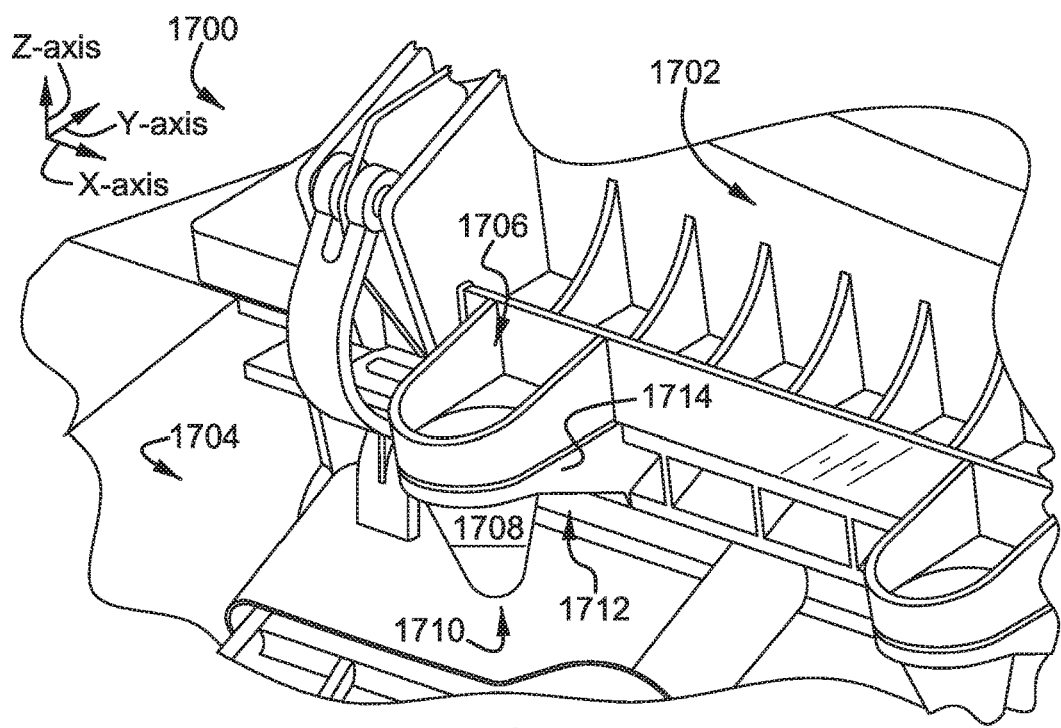
FIGS. 17-18 illustrate a third embodiment of an air cleaner assembly.
Figure 18:
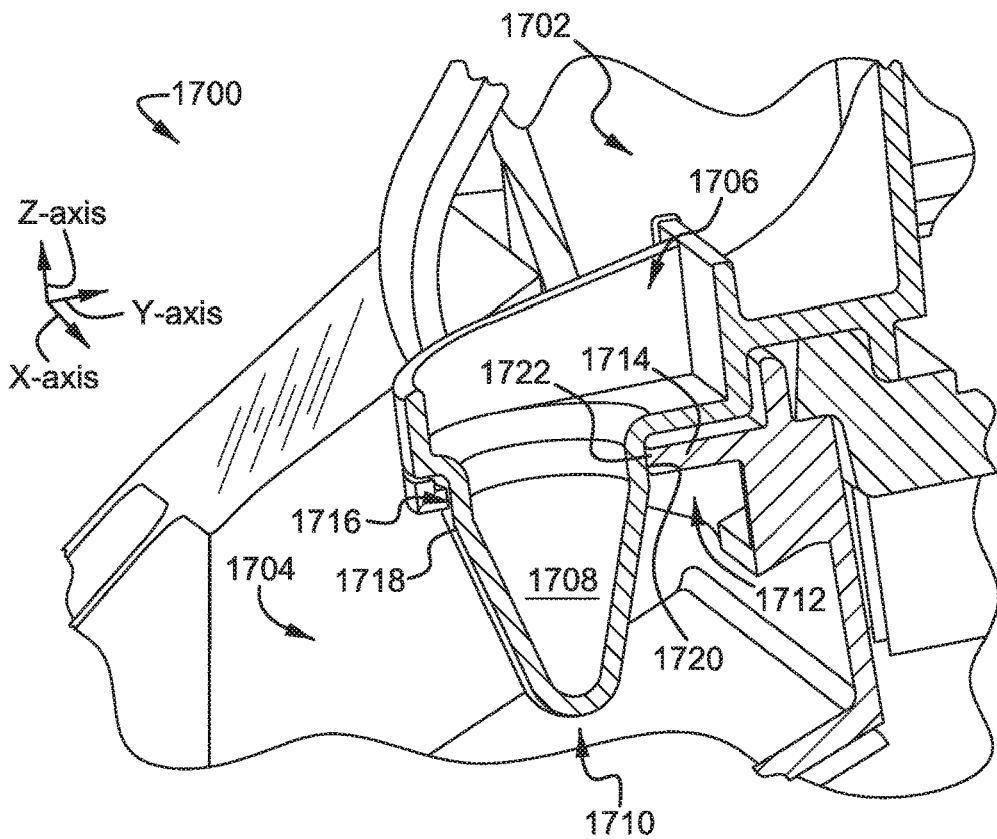
Figure 19:
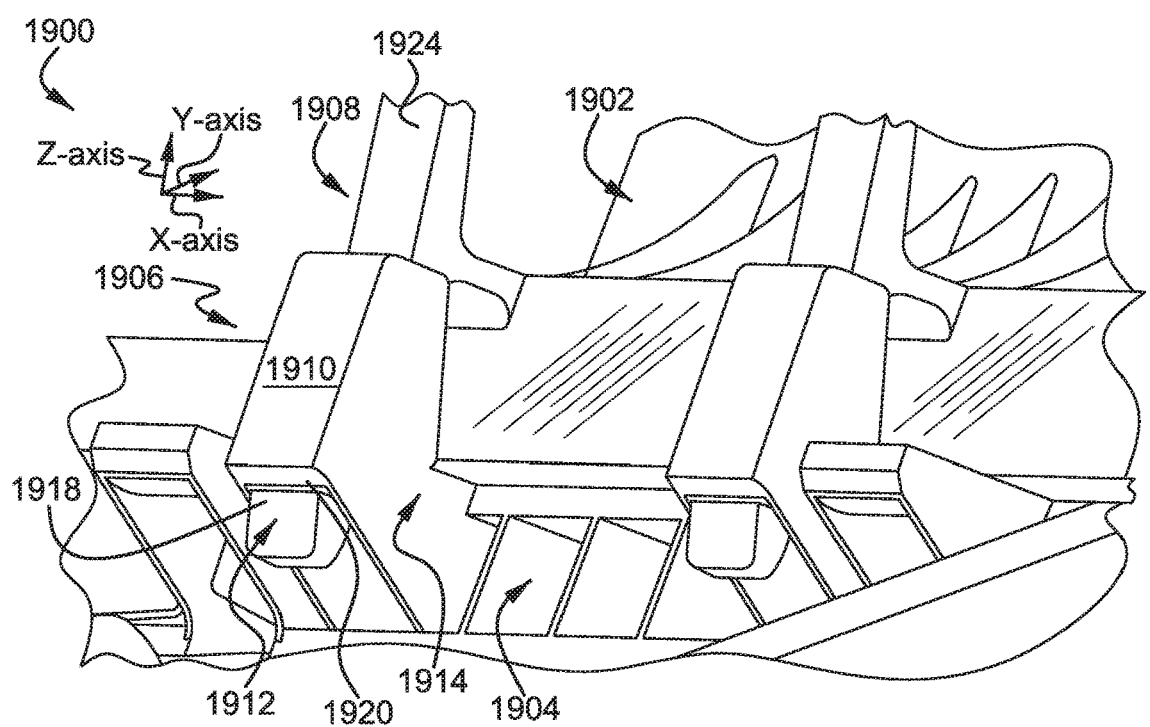
FIGS. 19-20 show a fourth embodiment of an air cleaner assembly.
Figure 20:
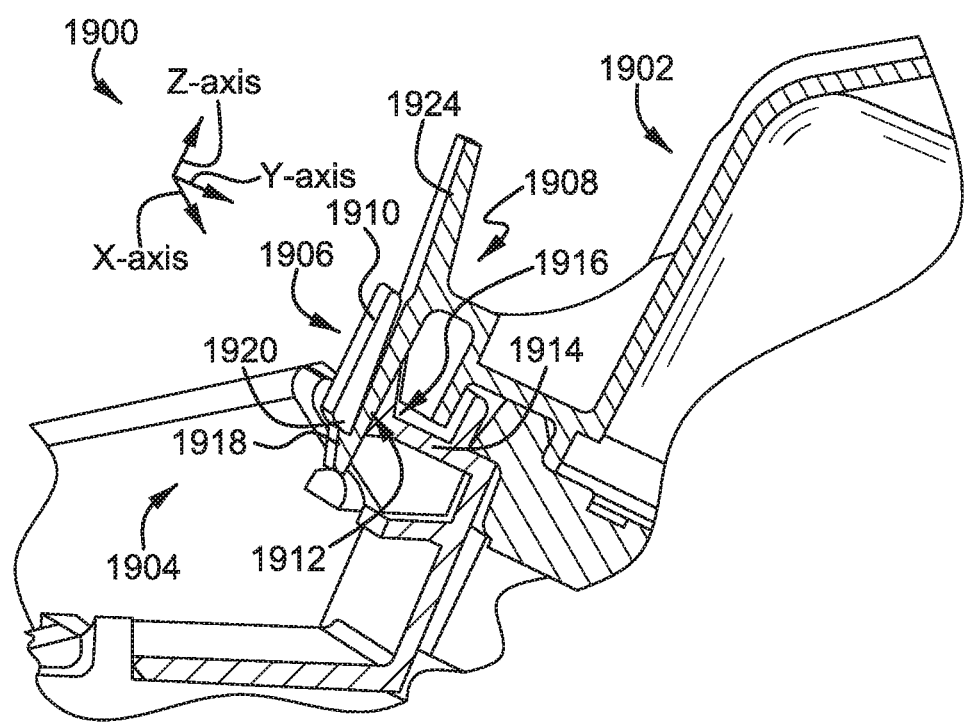

FIG. 1 provides a high-level schematic illustration of a vehicle with an intake system including an air cleaner assembly. FIGS. 2-14 show a first embodiment of the air cleaner assembly with clamps, ramped guide features, and mated cleat receptacles and cleats configured to align sections of the housing during closure of the housing. FIGS. 15-16 show a second embodiment of the air cleaner assembly with alternatively ramped guide features. FIGS. 17-18 show different views of a third embodiment of the air cleaner assembly with conical guide features. FIGS. 19-20 show a fourth embodiment of the air cleaner assembly with guide features including locking tabs.

Axes X, Y, and Z are provided in FIGS. 2-20 as a visual reference. The Z-axis may be a vertical axis (e.g., gravitational axis), in one example. Further in one example, the X-axis may be a lateral axis and the Y-axis may be a longitudinal axis. Furthermore, each of the axes may be perpendicular to one another. However, other orientations of the axes have been contemplated.

FIG. 1 shows a schematic representation of a vehicle 100 including an internal combustion engine 102. Although, FIG. 1 provides a schematic depiction of various engine and engine system components, it will be appreciated that at least some of the components may have different spatial positions and greater structural complexity than the components shown in FIG. 1.

An intake system 104 providing intake air to a cylinder 106, is also depicted in FIG. 1. A piston 108 is positioned in the cylinder 106. Although, FIG. 1 depicts the engine 102 with one cylinder and piston. The engine 102 may have additional cylinders and pistons, in other examples. For instance, the engine 102 may include a plurality of cylinders that may be positioned in various formations, such as in banks, in an inline configuration, etc.

The intake system 104 includes an air intake 110 providing intake air to an air cleaner assembly 112. The air cleaner assembly 112 includes an inlet 114 receiving air from the air intake 110, an air filter 116 filtering air flowing there through, and an outlet 118 guiding air to downstream components. The air filter 116 may include fibrous or porous materials that remove particulates from the air flowing the air cleaner assembly 112. The air cleaner assembly 112 is designed to guide the cleaner's housing into a desired alignment when closing the air cleaner to prevent the housing from being improperly assembled. The structural guides of the housing of the air cleaner assembly (as discussed herein), therefore, act to reduce the likelihood of unwanted air leaks in the air cleaner which can lead to combustion fouling, degradation (e.g., wear, malfunction, etc.) of intake system components, etc. Different embodiments of the air cleaner assembly 112 and housing alignment structures (e.g., structural guides) are shown in FIGS. 2-20 and described in greater detail herein. Furthermore, although the air cleaner assembly 112 is described herein in the context of a combustion engine it will be appreciated that the assembly may have applicability which extends to fields outside the automotive industry.

The intake system 104 further includes an intake conduit 120 is in fluidic communication with the air cleaner assembly 112. A throttle 122 is coupled to the intake conduit 120. The throttle 122 is configured to regulate the amount of airflow provided to the cylinder 106. For instance, the throttle 122 may include a rotatable plate varying the flowrate of intake air passing there through. In the depicted example, the throttle 122 feeds air to an intake conduit 124 (e.g., intake manifold). In turn, the intake conduit 124 directs air to an intake valve 126. The intake valve 126 opens and closes to allow intake airflow into the cylinder 106 at desired times. The intake valve 126, may include in one example, a poppet valve with a stem and a valve head seating and sealing on a cylinder port in a closed position.

Further, in other examples, such as in a multi-cylinder engine additional intake runners may branch off the intake conduit 124 (e.g., intake manifold) and feed intake air to other intake valves. It will be appreciated that the intake conduit 124 and the intake valve 126 are included in the intake system 104. Moreover, the engine shown in FIG. 1 includes one intake valve and one exhaust valve. However, in other examples, the cylinder 106 may include two or more intake and/or exhaust valves.

An exhaust system 128 configured to manage exhaust gas from the cylinder 106 is also included in the vehicle 100, depicted in FIG. 1. The exhaust system 130 includes an exhaust valve 128 designed to open and close to allow and inhibit exhaust gas flow to downstream components from the cylinder. For instance, the exhaust valve may include a poppet valve with a stem and a valve head seating and sealing on a cylinder port in a closed position. The exhaust system 130 also includes an emission control device 132 coupled to an exhaust conduit 134 (e.g., exhaust manifold). The emission control device 132 may include filters, catalysts, absorbers, combinations thereof, etc., for reducing tailpipe emissions.

The engine 102 also includes an ignition system 136 including an energy storage device 138 designed to provide energy to an ignition device 140 (e.g., spark plug). For instance, the energy storage device 138 may include a battery, capacitor, flywheel, etc. Additionally or alternatively, the engine 102 may perform compression ignition. As such, in one example, the ignition system 136 may be omitted from the engine 102 and compression may be used to ignite an air fuel mixture during the combustion cycles.

FIG. 1 also shows a fuel delivery system 142. The fuel delivery system 142 provides pressurized fuel to a fuel injector 144 from a fuel reservoir 146. In the illustrated example, the fuel injector 144 is a direct fuel injector coupled to cylinder 106. Additionally or alternatively, the fuel delivery system 142 may include a port fuel injector designed to inject fuel upstream of the cylinder 106 into the intake system 104. For instance, the port fuel injector may be an injector with a nozzle spraying fuel into an intake port at desired times. The fuel delivery system 142 includes a fuel pump 147 designed flow pressurized fuel to downstream components. For instance, the fuel pump 147 may be a pump driven by the crankshaft 160 with a piston and an inlet in the fuel tank that draws fuel into the pump and delivers pressurized fuel to downstream components. However, other suitable fuel pump configurations have been contemplated. Additionally or alternatively the fuel delivery system may include a second fuel pump (e.g., higher-pressure fuel pump) positioned external to the fuel tank. A fuel line 148 provides fluidic communication between the fuel pump 147 and the fuel injector 144. The fuel delivery system 142 may include additional components such as valves (e.g., check valves), return lines, etc., to enable the fuel delivery system to inject fuel at desired pressures and time intervals.

During engine operation, the cylinder 106 typically undergoes a four-stroke cycle including an intake stroke, compression stroke, expansion stroke, and exhaust stroke.

During the intake stroke, generally, the exhaust valve closes and intake valve opens. Air is introduced into the combustion chamber via the corresponding intake conduit, and the piston moves to the bottom of the combustion chamber so as to increase the volume within the combustion chamber. The position at which the piston is near the bottom of the combustion chamber and at the end of its stroke (e.g., when the combustion chamber is at its largest volume) is typically referred to by those of skill in the art as bottom dead center (BDC). During the compression stroke, the intake valve and the exhaust valve are closed. The piston moves toward the cylinder head so as to compress the air within the combustion chamber. The point at which the piston is at the end of its stroke and closest to the cylinder head (e.g., when the combustion chamber is at its smallest volume) is typically referred to by those of skill in the art as top dead center (TDC). In a process herein referred to as injection, fuel is introduced into the combustion chamber. In a process herein referred to as ignition, the injected fuel in the combustion chamber is ignited via a spark from an ignition device, resulting in combustion. However, in other examples, compression may be used to ignite the air fuel mixture in the combustion chamber. During the expansion stroke, the expanding gases push the piston back to BDC. A crankshaft converts this piston movement into a rotational torque of the rotary shaft. During the exhaust stroke, in a traditional design, exhaust valve is opened to release the residual combusted air-fuel mixture to the corresponding exhaust passages and the piston returns to TDC.

The vehicle 100 includes a crankshaft 160 receiving rotational input from the piston 108. Rods and/or other suitable mechanical components, indicated at 162, may be used transfer motion between the piston 108 and the crankshaft 160. It will be appreciated that the crankshaft 160 may be coupled to a transmission providing motive power to a drive wheel. Specifically, the transmission may include components such as a flywheel, a gearbox, clutch, driveshaft, etc., driving wheels (not shown) of the vehicle 100.

FIG. 1 also shows a controller 150 in the vehicle 100. Specifically, controller 150 is shown in FIG. 1 as a conventional microcomputer including: microprocessor unit 152, input/output ports 154, read-only memory 156, random access memory 158, keep alive memory 159, and a conventional data bus. Controller 150 is configured to receive various signals from sensors coupled to the engine 102 and send command signals to actuators in components in the vehicle, such as the throttle 122. Additionally, the controller 150 is also configured to receive pedal position (PP) from a pedal position sensor 170 coupled to a pedal 172 actuated by an operator 174. Therefore, in one example, the controller 150 may receive a pedal position signal and adjust actuators in the throttle based the pedal position signal to vary engine speed. It will be appreciated that other components receiving command signals from the controller may function in a similar manner.

Figures 2, 3:
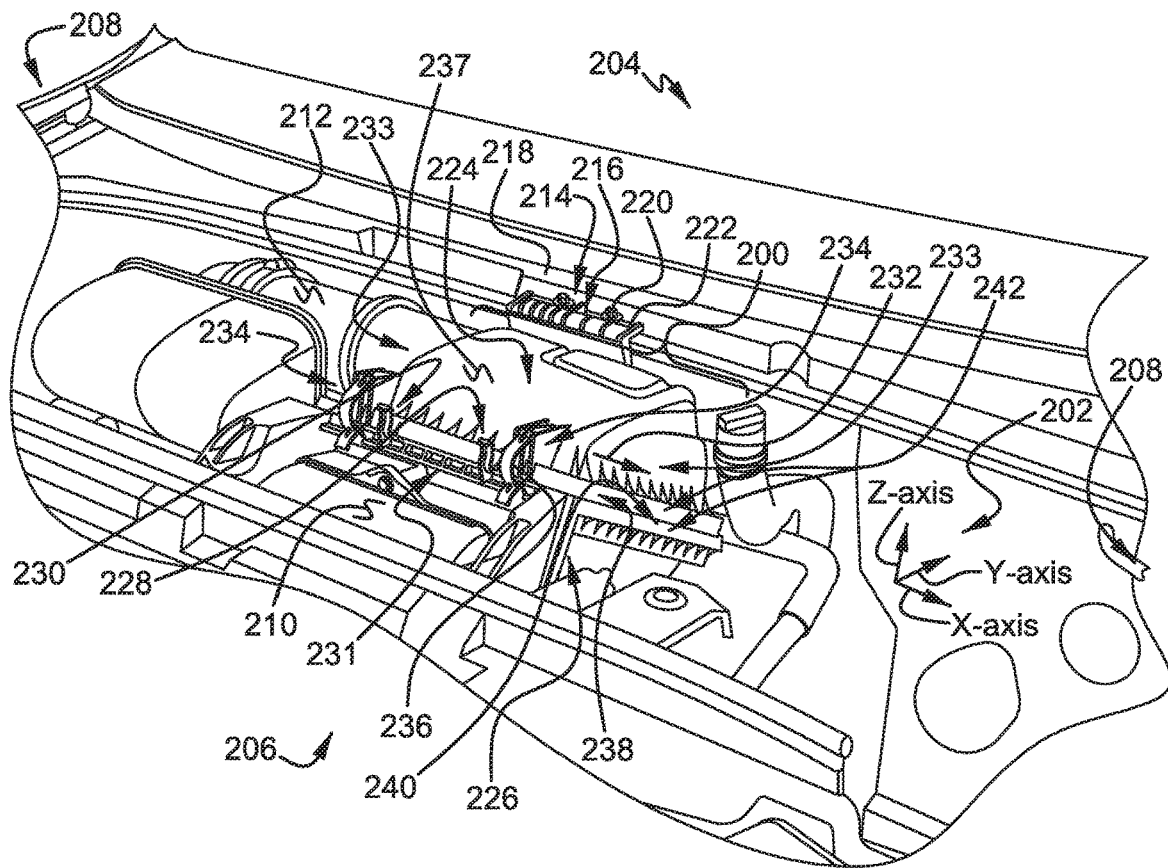
FIG. 2 illustrates a first embodiment of an air cleaner assembly positioned in an engine compartment.
FIG. 3 shows a perspective view of the first embodiment of the air cleaner assembly, shown in FIG. 2.

FIG. 2 shows a first embodiment of an air cleaner assembly 200. It will be appreciated that the first embodiment of the air cleaner assembly 200 as well as the other embodiments of the air cleaner assembly described herein are examples of the air cleaner assembly 112, shown in FIG. 1.

The air cleaner assembly 200 is shown at least partially enclosed within an engine compartment 202 in a vehicle 204. A hood (not shown) which may define an upper boundary of the engine compartment 202 is omitted to reveal the underlying components. Although the assembly 200 is shown positioned in the engine compartment, numerous suitable air cleaner assembly location have been envisioned such as locations external to the engine compartment 202 or in some cases the assembly may include sections within and external to the engine compartment. A front 206 of the vehicle 204 is shown along with sides 208 of the vehicle in FIG. 2. Additionally, an air intake 210 directing ambient air to the air cleaner assembly 200 is also shown in FIG. 2. The air intake 210 may draw air from within and/or external to the engine compartment 202. An intake conduit 212 receiving filtered air from the air cleaner assembly 200 is also shown in FIG. 2.

The air cleaner assembly 200 includes a mounting bracket 214 including an end 216 adapted to mount to a frame 218 of the vehicle 204. Attachment apparatuses 220 (e.g., bolts, screws, etc.) extend through a bracket flange 222 to allow the bracket to be attached to the frame 218. Additional or alternative attachment techniques have been contemplated such as clamping, adhesive attachment, welding, combinations thereof, etc.

The air cleaner assembly 200 further includes an upper housing 224 (e.g., cover) and a lower housing 226 (e.g., tray). The upper and lower housing (224 and 226) may be attached/detached from one another during installation, servicing, repair, etc., of an air filter enclosed within the assembly. An attached configuration is referred to herein as a seated position (e.g., fully seated position) and a detached configuration is referred to as an unseated position. It will be appreciated that the upper and lower housing (224 and 226) are in the seated position (e.g., fully seated position) in the configuration of the assembly shown in FIG. 2. In the seated position the housing of the assembly may be substantially sealed. On the other hand, in the unseated position the housing may be unsealed. The housing may be unseated, during assembly installation, servicing, repair, etc., for instance.

A first guiding member and a second guiding member, forming a guide feature 228 (e.g., guiding member pair), are included in the front side 231 of the air cleaner assembly 200. FIG. 2 also shows a second guide feature 230. Thus, the embodiment shown in FIG. 2 includes two guide features. However, in other examples, the assembly 200 may include one guide feature or more than two guide features. FIG. 2 also shows lateral sides 233 of the assembly 200.

To elaborate on the guide feature functionality, the guiding members in the guide features (228 and 230) are adapted to continuously interface with one another and guide the upper housing 224 rearward when the assembly is transitioned from the unseated position to the seated position. A rearward direction, is indicated at 232, for reference. Specifically, the guiding members in the guide features (228 and 230) may maintain contact with one another in both the unseated and seated positions and during a transition between the two positions. In this way, the upper housing may be moved along a desired path, relative to the lower housing 226, during closure of the assembly to maintain desired alignment. Such alignment may reduce the likelihood of unaligned closure of the assembly that can lead to air leaks downstream of the air filter. Consequently, the chance of combustion fouling, intake component degradation, etc., caused by the unwanted particulates traveling into the intake system is reduced. FIGS. 11-14 show a sequence where the assembly is transitioned between the unseated position to the seated position and is described in greater detail herein.

FIG. 2 also illustrates clamps 234. In the depicted example, the clamps 234 are arranged adjacent to the guide features (228 and 230). However, in other embodiments, the clamps 234 may be spaced away from the guide features (228 and 230). Although FIG. 2 shows the assembly with two clamps, in other examples, the assembly may include a single clamp, more than two clamps, etc. The clamps 234 each include a body 236 rotationally attached to the upper housing 224.

The clamps 234 may be designed to latch the upper housing 224 to the lower housing 226 only when the assembly 200 is in the seated position. The size, placement, and angular orientation of components in the clamps 234 may be chosen to prevent the clamps from latching until the assembly is placed in the seated positioned. For instance, a length of the bodies 236 may be selected such that if the upper and lower housing are misaligned clamping action cannot be performed. As illustrated, the bodies 236 of the clamps curve away from a body 237 of the upper housing 224. However, other clamp body contours have been envisioned.

In the illustrated example, the clamps 234 are positioned laterally outside of the guide features (228 and 230). However, in other embodiments, at least one of the clamps may be positioned laterally inward with regard to the guide features (228 and 230). It will also be appreciated that in some examples, the clamps may be omitted from the assembly 200.

FIG. 2 also shows an interface 238 between the upper housing 224 and the lower housing 226. The interface 238 substantially seals the assembly 200 such that air does not leak past the air filter in the assembly. It will be appreciated that the interface is created when the assembly 200 is placed in the seated position. The interface 238 extends around an outer perimeter 240 of the assembly 200. The interface 238 may include two planar surfaces extending around the respective perimeters 242 of upper housing 224 and the lower housing 226. Specifically, in one example, the planar surfaces may be vertically aligned. However, other planar surface orientations are envisioned.

Figure 11:
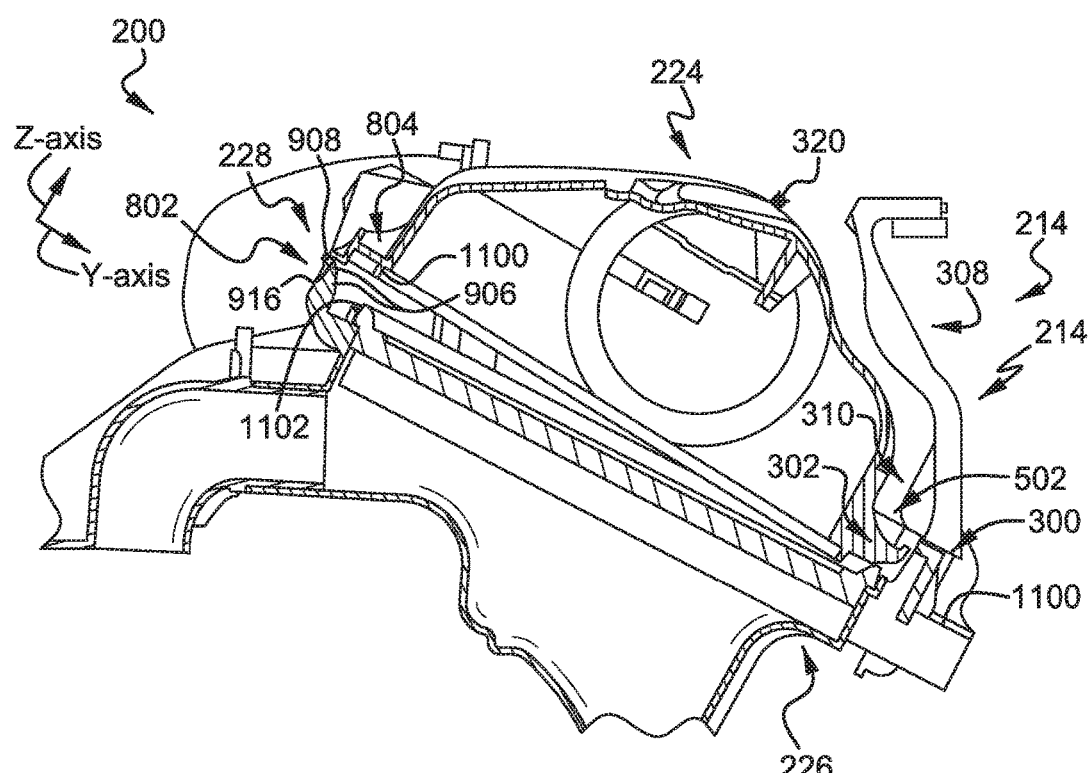
FIGS. 11-14 depict a sequence in which the air cleaner assembly is transitioned from an unseated position to a seated position.

Turning to FIG. 11 showing a planar surface 1100 in the upper housing 224 of the assembly 200. The assembly shown in FIG. 11 is in an unseated position. However, when the assembly 200 is in the seated position the planar surface 1100 may be in face sharing contact with a planar surface 1102 in the lower housing 226 to form the interface 238, shown in FIG. 2. The planar surface 1100 therefore may mate with the planar surface 1102, when the assembly is in the seated position to seal the assembly. However, in other examples, a gasket may be used to seal the interface in the assembly. The gasket may be positioned between sealing surfaces in the upper and lower housing. In one specific example, the gasket may be included in a periphery of the air filter. However, in other examples the gasket may be included in the upper housing or the lower housing. FIG. 3 shows a perspective view of the air cleaner assembly 200. The guide features (228 and 230) are again shown along with the clamps 234. The air cleaner assembly 200 includes a cleat receptacle 300 in the lower housing 226 and a cleat 302 in the upper housing 224 at a back side 304 of the assembly. The cleat 302 is seated with the cleat receptacle 300 in the seated position of the assembly, shown in FIG. 3. It will be appreciated that the lower housing 226 includes another cleat receptacle and cleat positioned on the opposing side of the air cleaner assembly 200. Thus, the illustrated air cleaner assembly 200 includes two cleat receptacles. However, assemblies including a single cleat receptacle or more than two cleat receptacles and cleats have been envisioned. The cleat receptacle 300 may also be referred to as a pocket or a cleat backstop or catch. In this way, as described further below, the cleat receptacle 300 is adapted to receive and contain the corresponding cleat 302. The cleat receptacle 300 may also be referred to as a dog house.

The cleat 302 is mated with in the cleat receptacle 300 in the seated position of the assembly shown in FIG. 3. Such interaction between the cleat 302 and the cleat receptacle 300 allows the guide features (228 and 230) and the clamps 234 at the front of assembly to be guided into a desired position when the assembly is shifted into the seated position. Specifically, in one example, the cleat receptacle 300 and cleat 302 may work in conjunction with the guide features (228 and 230) to maintain housing alignment when the assembly is transitioned into the seated position. For instance, the cleat receptacle 300 and cleat 302 may be designed such that the mating interaction can only take place when the members in the guide features (228 and 230) are correspondingly interacting or vice versa. The size, profile, etc., of the cleat, cleat receptacle, and guide features (228 and 230) may be precisely selected to achieve the aforementioned functionality. For instance, a longitudinal length of the guide features (228 and 230) may be selected to allow members in the features to maintain contact with one another only when the cleat 302 is mated with the cleat receptacle 300.

The mounting bracket 214 is again shown in FIG. 3. The mounting bracket 214 includes the end 216 coupled to the frame 218, shown in FIG. 2, or other suitable vehicle component, as previously discussed. The mounting bracket 214 also includes another end 306 coupled (e.g., directly coupled) to the lower housing 226. The mounting bracket 214 further includes a body 308 extending between the end 216 and the end 306. The mounting bracket 214 also extends along a height of the upper housing 224, in the illustrated example. However, a mounting bracket that extends rearward away from the upper housing 224 may also be used.

A plurality of guide ribs 310 included in the mounting bracket 214 are also shown in FIG. 3. In the depicted example, there are specifically three guide ribs having corresponding contours and spaced away from one another across a width 312 of the body 308 of the mounting bracket 214. Further, in one example, one of the guide ribs (e.g., the middle guide rib) may be aligned with a mid-point 314 of the width 312 of the mounting bracket 214. However, in other examples, the mounting bracket 214 may include one guide rib, two guide ribs, more than three guide ribs, etc., and/or two or more of the guide ribs may at least partially contact one another. The guide ribs 310 may also be omitted from the assembly in some instances. The guide ribs 310 function to align the upper housing 224, and push the upper housing 224 downward with respect to the z-axis, while the assembly 200 is transitioned to the seated position, to further decrease the chance of housing misalignment.

The guide ribs 310 extend outward from an inner surface 316 of the mounting bracket 214 towards an outer surface 322 of the upper housing 224. As described herein, outward refers to a direction extending away from a centerline 320 and/or a central point of the assembly 200. Likewise inward refers to a direction extending towards the centerline 320 and/or a central point of the assembly. Additionally, the inner surface 316 of the mounting bracket 214 faces the outer surface 322 of the upper housing 224 and the guide ribs 310 extend in the space there between, in the embodiment shown in FIG. 3. However, in other embodiments, the mounting bracket may extend rearward away from the upper housing 224. In one particular example, the guide ribs 310 may extend toward the upper housing 224 at a vertical position that is above a top surface 324 of the cleat receptacle 300 and/or in a location between the ends (216 and 306) of the mounting bracket 214. In alternate configurations, however, the guide ribs 310 may not extend above the top surface 324.

FIG. 3 also shows the body 308 of the mounting bracket 214 curving inward towards the centerline 320 of the air cleaner assembly 200. Specifically, in the illustrated example, the inner surface 316 of the mounting bracket 214 and the outer surface 322 of the upper housing 224 are similarly contoured to increase compactness of the assembly. It will be understood that the inner surface 316 of the mounting bracket 214 may be arranged opposite the outer surface 322 of the upper housing 224. However, alternate contours of the upper housing 224 and mounting bracket 214 have been envisioned that may not be curved and/or may not have corresponding profiles. A viewing plane 326 is provided in FIG. 3 for reference indicating the location of the cross-sectional views shown in FIGS. 7 and 11-14.

FIG. 3 shows the guide ribs 310 spaced apart from one another across the width 312 of the body 308 of the mounting bracket 214. However, in other examples, two or more of the guide ribs may at least partially contact one another. Furthermore, the guide ribs 310 extend over a top 328 of a portion of the upper housing 224 including the cleat 302, in the illustrated example. However, the guide ribs 310 may be positioned below the cleat 302, in other examples.

Figure 4:
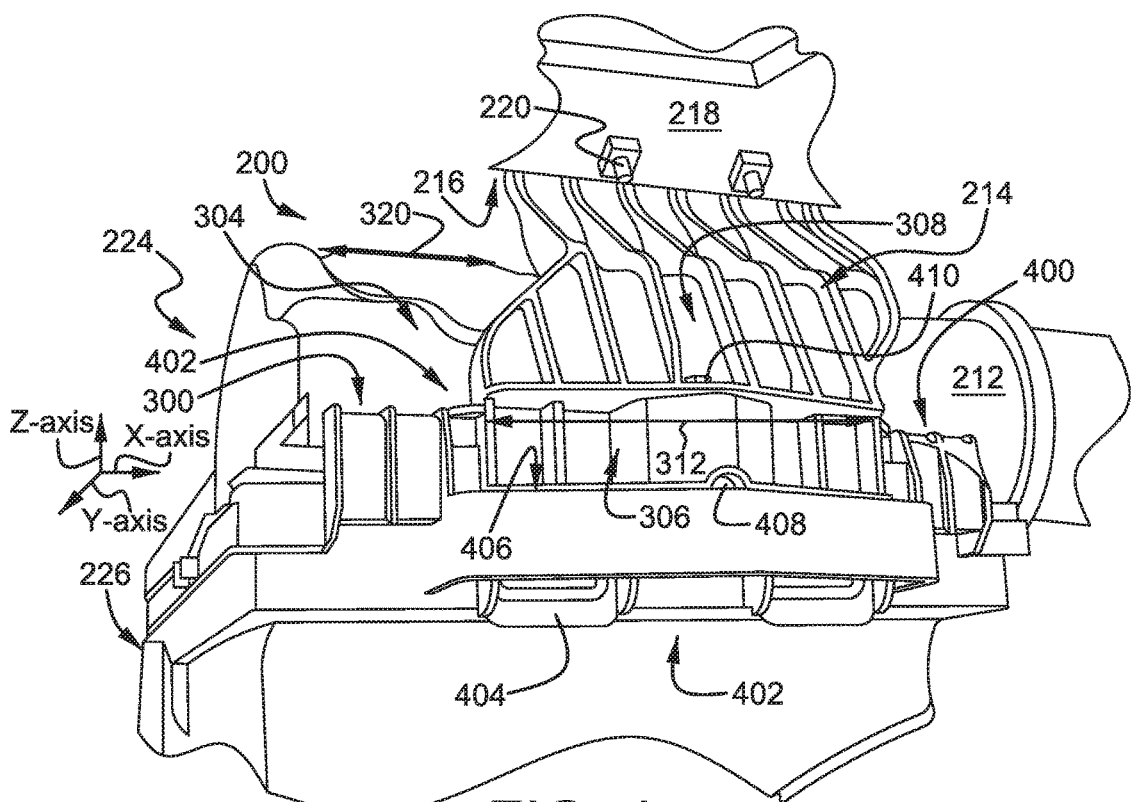
FIG. 4 shows a back side of the first embodiment of the air cleaner assembly, shown in FIG. 2.

FIG. 4 shows the back side 304 of the air cleaner assembly 200. The cleat receptacle 300 in the lower housing 226 is illustrated in FIG. 4. Another cleat receptacle 400 included in the lower housing 226 is also shown in FIG. 4. It will be appreciated that a cleat corresponding to the cleat receptacle 400 may be included in the upper housing 224. As such, the assembly 200 includes two cleats and two cleat receptacles. However, in other examples, the assembly may include one cleat receptacle and one cleat or three or more cleat receptacles and three or more cleats.

The cleat receptacles (300 and 400) and the corresponding cleats may be symmetrically positioned with regard to a longitudinal centerline 350 of the assembly 200, shown in FIG. 3, to allow both cleats and cleat receptacles to synchronously mate and prevent off-axis movement of the upper housing with regard to the lower housing during assembly closure. This type of symmetry may also be found in the clamps 234 and/or guide features (228 and 230), shown in FIG. 3, in some examples. However, asymmetric cleat receptacle and cleat positioning, clamp positioning, and/or guide feature positioning may be used, in other examples.

Returning to FIG. 4, the mounting bracket 214 is coupled to the lower housing 226 between the two cleat receptacles (300 and 400), in the illustrated example. In this way, the mounting bracket 214 may be positioned such that the guide ribs 310, shown in FIG. 3, uniformly shift both the cleats in the upper housing 224 into the cleat receptacles (300 and 400) when the assembly is transitioned into the seated configuration. In alternate examples, at least a portion of the mounting bracket 214 may be positioned peripheral to the cleat receptacles (300 and 400) with regard to a lateral axis.

The mounting bracket 214 is again shown in FIG. 4. The end 216 of the mounting bracket 214 is attached to the frame 218 via attachment apparatuses 220 (e.g., screws, bolts, etc.) as previously discussed. The end 306 of the mounting bracket 214 is attached (e.g., removably attached) to the back side 402 of the lower housing 226. In the illustrated example, bracket tabs 404 in the mounting bracket 214 are mated with tab openings 406 in the lower housing 226. Additionally, the lower housing 226 includes a mounting boss 408 arranged outward of the cleat receptacles (300 and 400) with regard to the centerline 320. A fastener 410 (e.g., screw, bolt, etc.) extends through the mounting bracket 214 and into the mounting boss 408. However, numerous suitable attachment techniques have been contemplated. For instance, clamps, adhesive, welds, combinations therefore, etc., may be used to attach the mounting bracket 214 to the lower housing 226. Additionally, the intake conduit 212 is again illustrated in FIG. 4.

Figure 5:
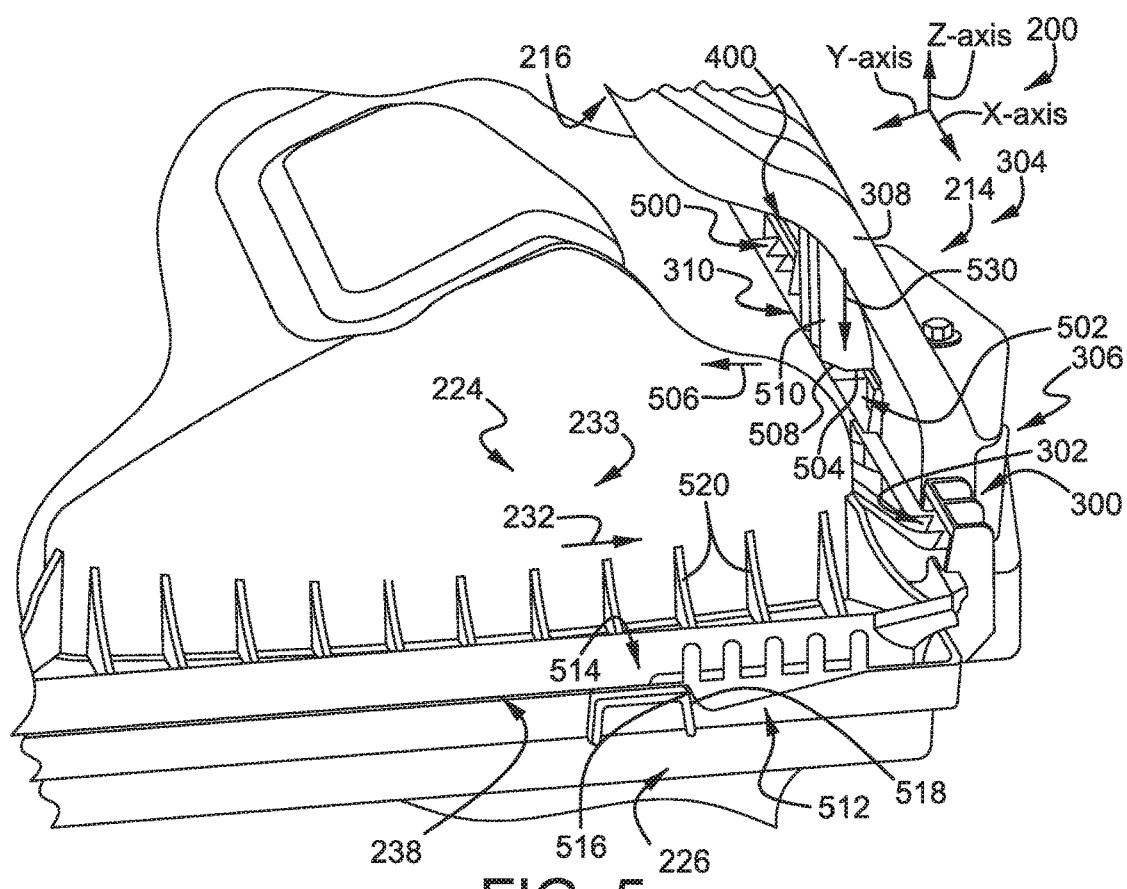

FIG. 5 shows a side view of the air cleaner assembly 200 in the fully seated position. The lateral sides 233 and the back side 304 of the air cleaner assembly 200 are again depicted. The cleat receptacle 300 is shown mated with the cleat 302. Likewise, the cleat receptacle 400 is shown mated with a cleat 500. Thus, as shown in FIG. 5, the cleat 302 is received within an interior cavity of cleat receptacle 300 and cleat 500 is received within an interior cavity of cleat receptacle 400.

The guide ribs 310 in the mounting bracket are also depicted in FIG. 5. The guide ribs 310 function to direct an alignment projection 502, positioned at the back side of the assembly in the upper housing 224, rearward and downward when the assembly is transitioned into the seated position. The rearward direction is indicated via arrow 232 and the downward direction in indicated via arrow 530. When the alignment projection 502 is moved in this manner the cleats (302 and 500) will be moved into and mate in a desired manner with the cleat receptacles (300 and 400, respectively). In this way, the cleats and cleat receptacles may be urged together and into mating alignment during closure of the assembly. As shown, the alignment projection 502 is included in the upper housing 224. However, in other examples, the alignment projection 502 may be left out of the assembly 200.

As shown in FIG. 5, the guide ribs 310 each include a first planar surface 504 extending in a forward direction, indicated via arrow 506, from the mounting bracket body 308 over the lower housing 226. The guide ribs 310 also include an angled surface 508 extending upward and at an angle from the first planar surface 504. The guide ribs 310 further include a second planar surface 510 extending vertically upward from the angled surface 508, in a direction of the z-axis. However, other guide rib contours and/or surfaces have been contemplated.

The planer surfaces (504 and 510) and the angled surface 508 of the guide ribs 310 serve to guide the upper housing 224 into the seated position during assembly closure. Both the first and second planar surfaces (504 and 510) may be directly coupled to the body 308 of the mounting bracket 214 between the ends (216 and 306) of the mounting bracket 214. As shown, the first planar surface 504 is closer to the end 306 than the second planar surface 510. However, in other examples, the second planar surface 510 may be closer to the end than first planar surface 504.

The upper housing 224 also includes guide extensions 512 on the lateral sides 233 of the assembly. The guide extensions 512 interact with guide projections 514 in the lower housing 226 to again provide desired alignment between the upper housing 224 and the lower housing 226. The guide extensions 512 include angled surfaces 516 interacting with correspondingly angled surfaces 518 in the guide projections 514. Reinforcing ridges 520 are also included in the assembly 200 to reduce unwanted deformation of the planar surfaces in the interface 238 between the upper housing 224 and the lower housing 226. By reducing unwanted surface deformation a more robust assembly seal can be achieved. However, in other examples the reinforcing ridges 520 may be omitted from the assembly 200.

Figure 6:
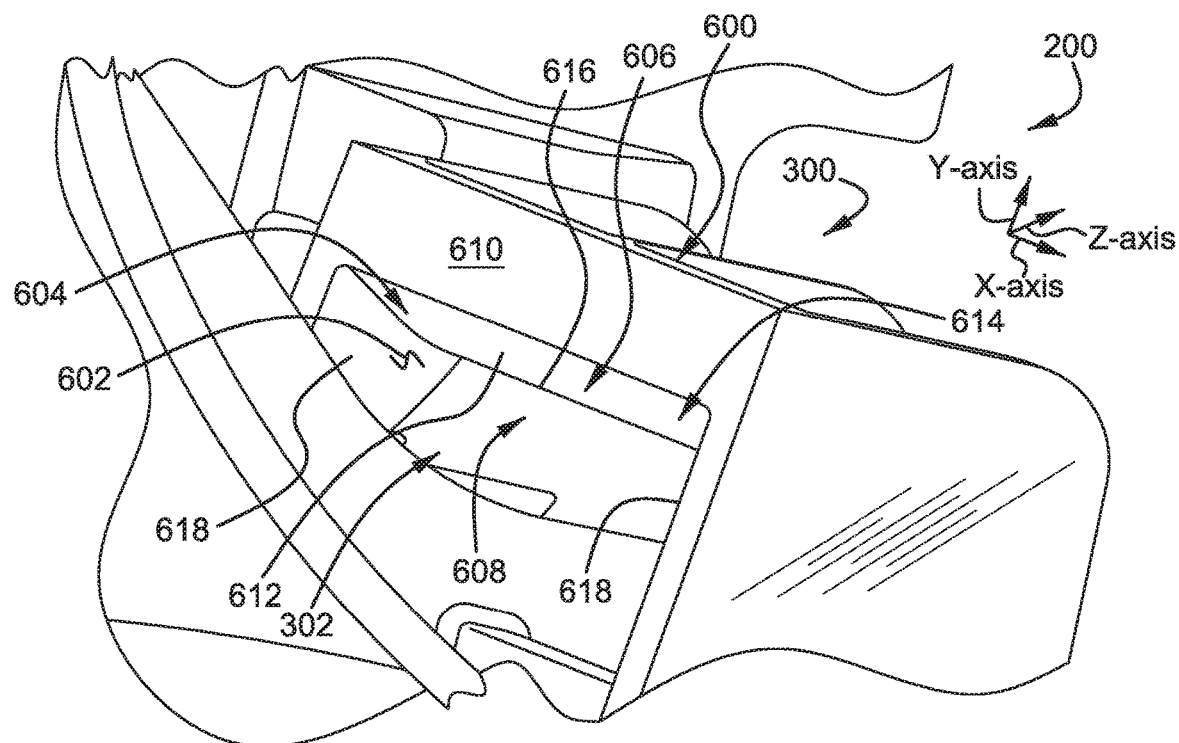
FIG. 6 shows a detailed view of a cleat and a cleat receptacle included in the air cleaner assembly, shown in FIG. 2.

FIG. 6 shows a detailed view of the cleat 302 and the cleat receptacle 300 in the assembly 200. The cleat receptacle 300 includes an outer housing 600 with a cavity 602. In one example, an opening 604 in the side of the cleat receptacle 300 forms an entrance into the cavity 602 positioned within an interior of the cleat receptacle 300.

In one specific example, the cleat receptacle 300 may be fully enclosed except for the opening 604. In such an example, in the seated position an end 606 (e.g., distal end) of an upwardly extending fin 608 of the cleat 302 is fully enclosed within the cleat receptacle 300. However, in other instances, only a portion of the end 606 of the fin 608 may be enclosed within the cleat receptacle 300.

An upper wall 610 of the cavity 602 includes a chamfered outer surface 612. The chamfered outer surface 612 functions to guide the upwardly extending fin 608 of the cleat 302 into the cavity 602 when the assembly is transitioned into the seated position. The fin 608 therefore mates with the cavity 602 in the seated position shown in FIG. 6. It will be appreciated that the upwardly extending fin 608 may slide along the chamfered outer surface 612 during such mating. Furthermore, when the fin 608 is mated in the cavity 602, the guide features (228 and 230), shown in FIG. 3 may also be mated. In this way, desired alignment at the front as well as the rear of the assembly's housing can be maintained.

It will also be understood that the upwardly extending fin 608 may be located at a distal end 614 of the cleat 302 and the cleat may extends outward from the body 237 of the upper housing 224, shown in FIG. 2. Moreover, the upwardly extending fin 608 is shown including a planar surface 616 at the end 606.

FIG. 6 also shows side walls 618 of the cleat receptacle 300 which may laterally limit movement of the cleat 302 when the cleat receptacle and cleat are mated. In this way, a desired lateral alignment of the upper housing 224 can be achieved when the assembly is transitioned into the seated position. In one example, the side walls 618 may include planar interior surfaces that are parallel to one another. However, other side wall contours have been contemplated.

Figure 7:
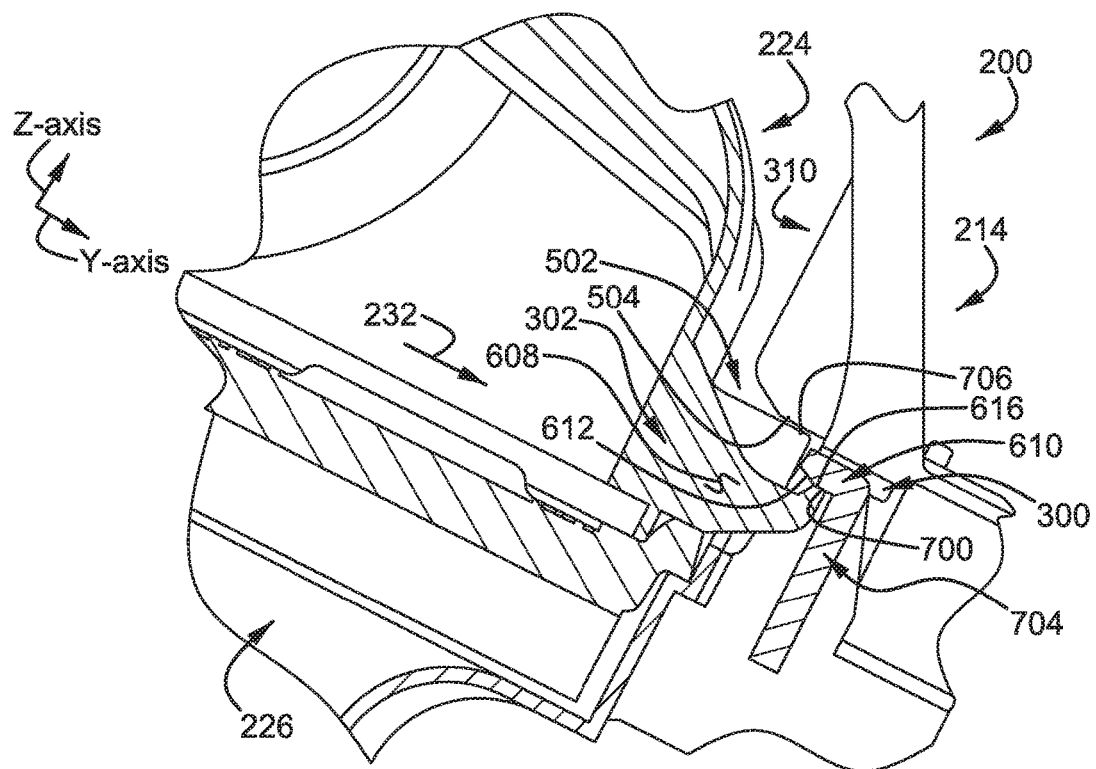
FIG. 7 illustrates a cross-sectional view of the cleat and the cleat receptacle, shown in FIG. 5.

FIG. 7 shows an upper inner surface 700 of the cleat receptacle 300 in the assembly 200. When mated the planar surface 616 of the fin 608 is in face sharing contact with the upper inner surface 700. The upper inner surface 700 is adjacent to the chamfered outer surface 612 to allow the cleat 302 to be smoothly transition into the mated position.

Additionally, the cleat receptacle 300 includes a planar surface 702 and the chamfered outer surface 612 angles downward toward the planar surface 702.

The cleat receptacle 300 also includes a back wall 704 limiting the backward movement of the cleat 302. The back wall 704 is positioned perpendicular to the upper wall 610, in the depicted example. Although other cleat receptacle wall orientations may be used.

FIG. 7 again shows the guide ribs 310 in the mounting bracket 214. The guide ribs 310 may interact with the alignment projection 502 included in the lower housing 226 to shift the upper housing 224 rearward with regard to the lower housing 226 when the assembly 200 is transitioned to the seated position. Again, the rearward direction is indicated via arrow 232. Specifically, the first planar surface 504 of the ribs 310 may travel alone an upper planar surface 706 of the alignment projection 502 during the rearward movement, in one example.

The guide ribs 310 are also shown positioned vertically above the cleat receptacle 300 in FIG. 7. However, the guide ribs may be positioned below or level with the cleat receptacle, in other examples.

Figure 8:
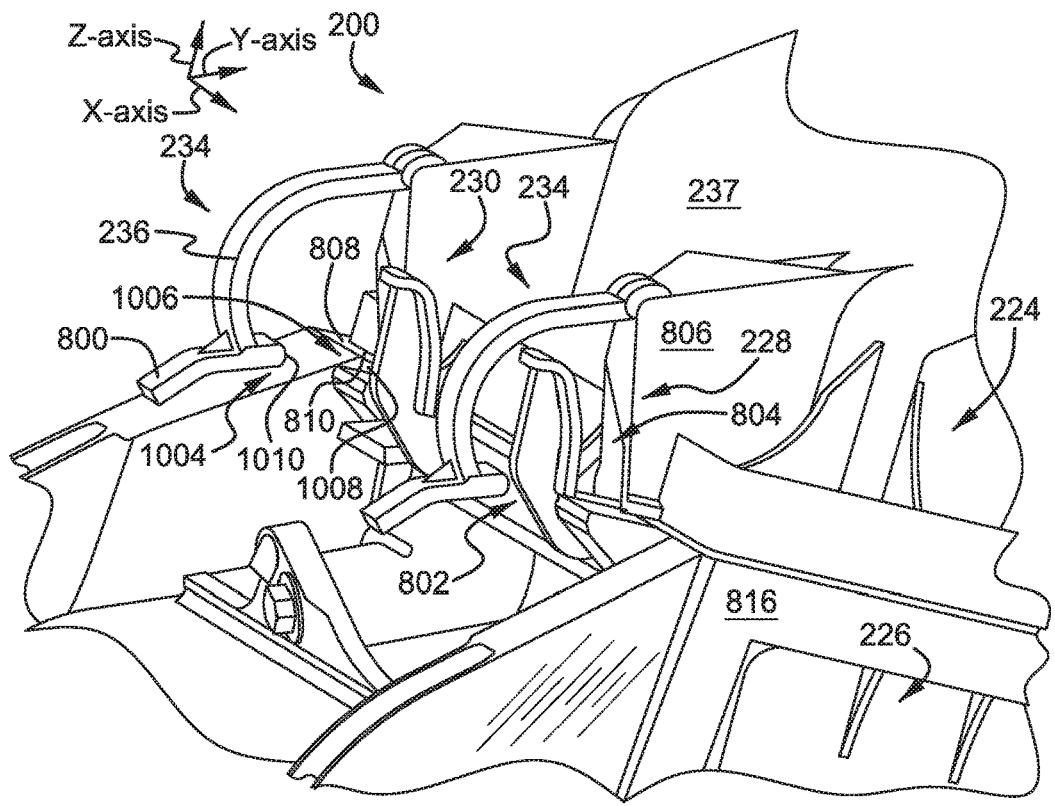
FIGS. 8-10 show detailed views of guide features and clamps included in the air cleaner assembly, shown in FIG. 2.

FIG. 8 shows the clamps 234 of the assembly 200 including clamp bodies 236 with actuation tabs 800 allowing a technician to actuate (i.e., lock and unlock) the clamps. For instance, the tabs 800 may be moved upward for release and downward to initiating clamping action.

FIG. 8 again shows the guide features (228 and 230). Each of the guide features include a first guiding member 802 pairing with a second guiding member 804. The first guiding member 802 is included in the lower housing 226 and the second guiding member 804 is included in the upper housing 224. However, in other examples, the first guiding member may be included in the upper housing and the second guiding member may be included in the lower housing. As previously discussed, the guiding members function to shift the upper housing rearward relative to the lower housing when the assembly is being transitioned into a seated position.

FIG. 8 also shows clamp mounting walls 806 extending from the body 237 of the upper housing 224. The clamp mounting walls 806 enable the rotational coupling of the clamps 234 to the upper housing 224. However, other structural features may be used to attach the clamps to the upper housing 224.

FIG. 8 also shows a peripheral lip 808 included in the lower housing 226. It will be appreciated that the peripheral lip 808 may extend around at least a portion of the perimeter of the assembly 200. The peripheral lip 808 may be adjacent to a peripheral surface 810 in the upper housing 224 when the assembly 200 is closed. However, in other examples, the peripheral surface 810 may be spaced away from the peripheral lip 808 when the assembly 200 is seated. The peripheral lip 808 is arranged in a horizontal plane in FIG. 8. However, the peripheral lip 808 may be arranged on a non-horizontal plane, in other examples.

Figure 9:
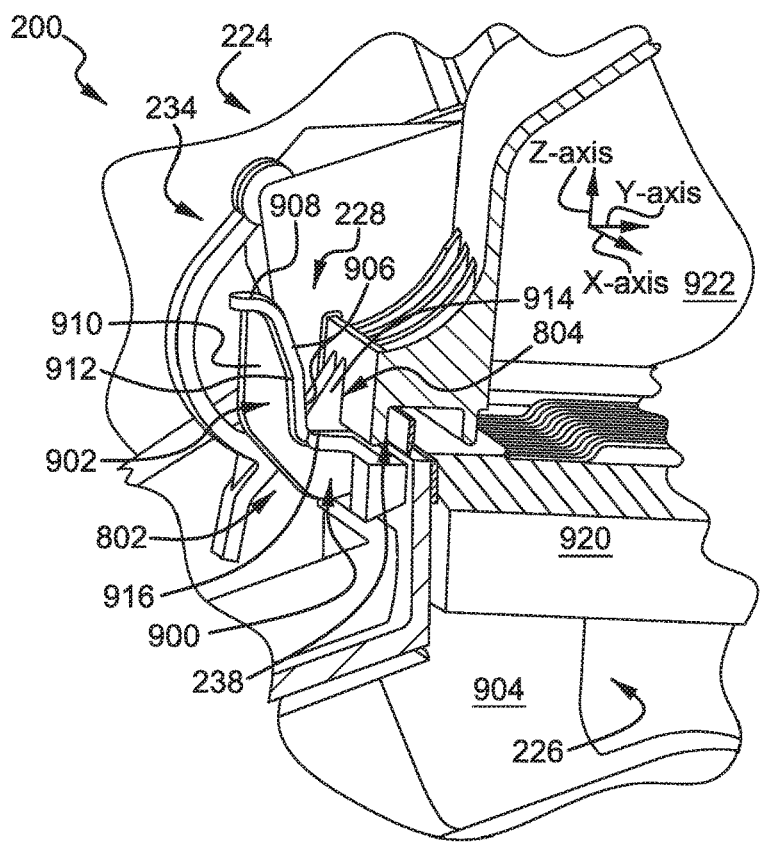

FIG. 9 shows the second guiding member 804 included in the upper housing 224. The second guiding member 804 takes the form of a mating flange, in the illustrated embodiment. The first guiding member 802 in the lower housing 226 is also depicted. In the depicted embodiment, the first guiding member 802 takes the form of a ramped structure. However, other types of guiding members have been envisioned. The first and second guiding members (802 and 804) guide the upper housing 224 rearward when the assembly 200 is transitioned into the seated position. Such guiding may be achieve through continuous contact (e.g., face sharing contact) between the first and second guiding members (802 and 804) prior to, during, and/or after the transition. As such, the chance of assembly misalignment is substantially reduced.

The first guiding member 802 includes an outwardly extending portion 900 and an upwardly extending portion 902 (e.g., ramped flange). The outwardly extending portion 900 extends away from the body 904 of the lower housing 226 and the upwardly extending portion 902 extends vertically upward (in a direction of the z-axis) from the outwardly extending portion 900.

The upwardly extending portion 902 may include ramped surfaces 906 connected to one another at an angle. The upwardly extending portion 902 may also include a top, planar surface 908. Additionally, the top, planar surface 908 may be parallel to the peripheral lip 808 included in the lower housing 226, shown in FIG. 8. Continuing with FIG. 9, the ramped surfaces 906 may be arranged at an angle with regard to the peripheral lip 808. In one particular example, the angle of the first and/or ramped surfaces with regard to the lip may be in the range of 30°-80°, 45°-75°, or 60°-70° degrees. Furthermore, in some examples, the upper ramped surface may have a greater angle than the lower ramped surface.

The first guiding member 802 may also include a central rib 910 extending outward from an outer surface 912 of the member. The outer surface 912, in this example, is arranged opposite the ramped surfaces 906. The central rib 910 provides structural support to the first guiding member 802, thereby increasing the support's structural integrity.

The second guiding member 804 includes a mating flange 914 with a bottom planar surface 916. In the seated position the bottom planar surface 916 may be in face sharing or near face sharing contact with an upper surface 918 of the outwardly extending portion 900.

The first guiding member 802 is show positioned vertically below the tops of the clamps 234. However, in other examples the first guiding member 804 may be positioned above or extend vertically above the tops of the clamps 234. Although FIG. 9 only shows the guide feature 228, it will be understood that the guide feature 230, shown in FIG. 8, may have similar features, profiles, functions, etc., to the guide feature 228.

FIG. 9 also shows an air filter 920 enclosed within the upper housing 224 and the lower housing 226. The air filter 920 is configured to remove particulates from the air flowing through the assembly. For instance, the air filter 920 may include one or more sheets of fibrous or porous material capturing particulates such as dust, debris, etc. Furthermore, the air filter 920 may span (e.g., horizontally span) an interior enclosure 922 formed by the upper housing 224 and the lower housing 226 to allow for particulate removal. In one example, the air filter 920 may span the interior enclosure adjacent to the interface 238 between the upper housing 224 and the lower housing 226. However, other suitable air filter 920 locations have been contemplated.

FIG. 10 again shows the clamps 234 and the guide features (228 and 230) in the assembly 200. As shown, the clamps 234 are coupled to the upper housing 224 at a location outside (e.g., laterally outside, with respect to the x-axis) where the guide features (228 and 230) are attached to the upper housing 224. Positioning the clamps and guide features in this arrangement may increase the compactness of the assembly.

Figure 10:
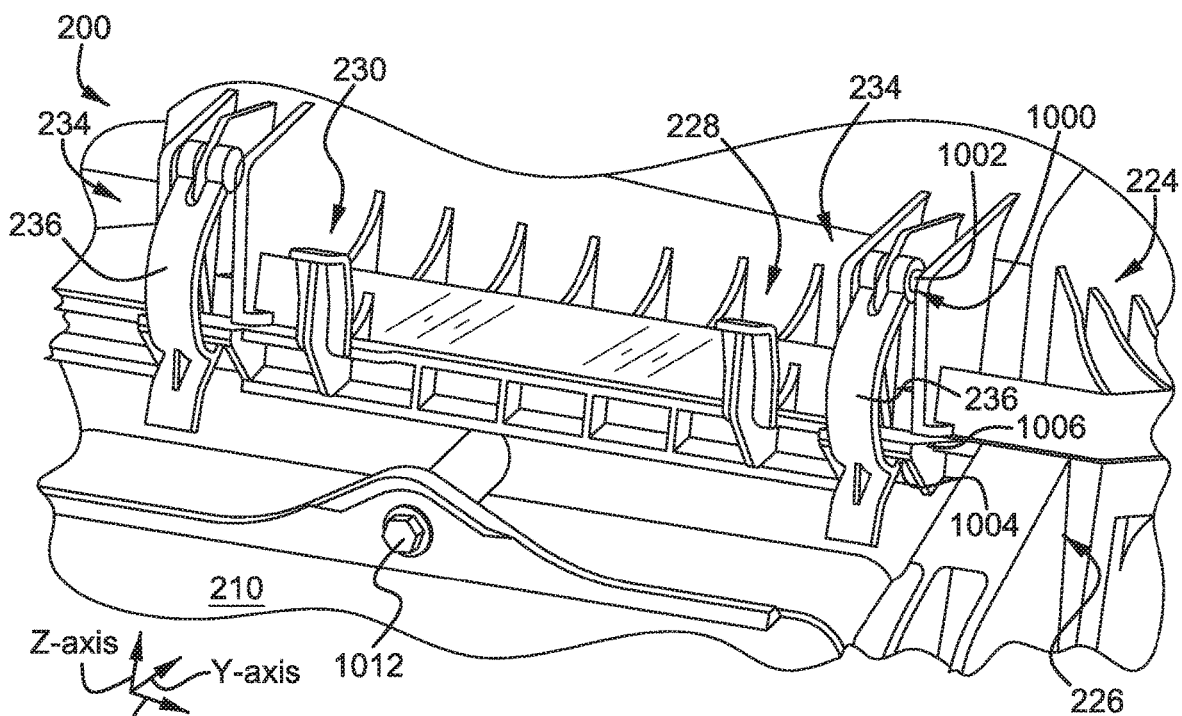

FIG. 10 also shows the clamp bodies 236. The clamp bodies 236 may include an opening 1000 mating with a cylindrical protrusion 1002 in the upper housing 224 to allow rotational attachment there between. The clamps 234 also include hooks 1004 shown in both FIGS. 9 and 10. The hooks 1004 are configured to removably couple to receiving members 1006 in the lower housing 226, shown in FIG. 8. For instance, rotation of the clamps 234 may allow the hooks 1004 to engage with and disengage from the receiving members 1006 when the assembly is in the seated position. The receiving members 1006 include a recess 1008 sized to mate with ends 1010 of the hooks 1004 (as shown in FIG. 8). The ends 1010 of the hooks 1004, shown in FIG. 8 are curved to allow for smooth mating with the receiving members 1006. However, other suitable clamp configurations have been envisioned.

FIG. 10 also shows the air intake 210. A fastener 1012 (e.g., bolt, screw, etc.) is shown attaching the air intake 210 to the lower housing 226. Other suitable attachment devices for attaching the air intake 210 and the lower housing may be used.

FIG. 11 shows the air cleaner assembly 200 in an unseated configuration where the cleat 302 is positioned completely outside of the cleat receptacle 300. However, in other examples, the cleat 302 may be partially positioned outside of the cleat receptacle 300 in the unseated configuration.

FIG. 11 also depicts the guide feature 228 with the first guiding member 802 and the second guiding member 804 interacting with one another. Specifically, the top planar surface 908 of the first guiding member 802 is in contact with the bottom planar surface 916 of the second guiding member 804. In this way, contact between the guiding members is maintained during an initial transitional stage to preserve desired housing alignment.

The guide ribs 310 are also shown in face sharing contact with the alignment projection 502 to preserve a desired alignment between the upper housing 224 and the lower housing 226.

FIG. 11 again shows the body 308 of the mounting bracket 214 curving inward from an outer surface 1110 of the lower housing 226 towards the centerline 320 of the air cleaner assembly 200.

Figure 14:
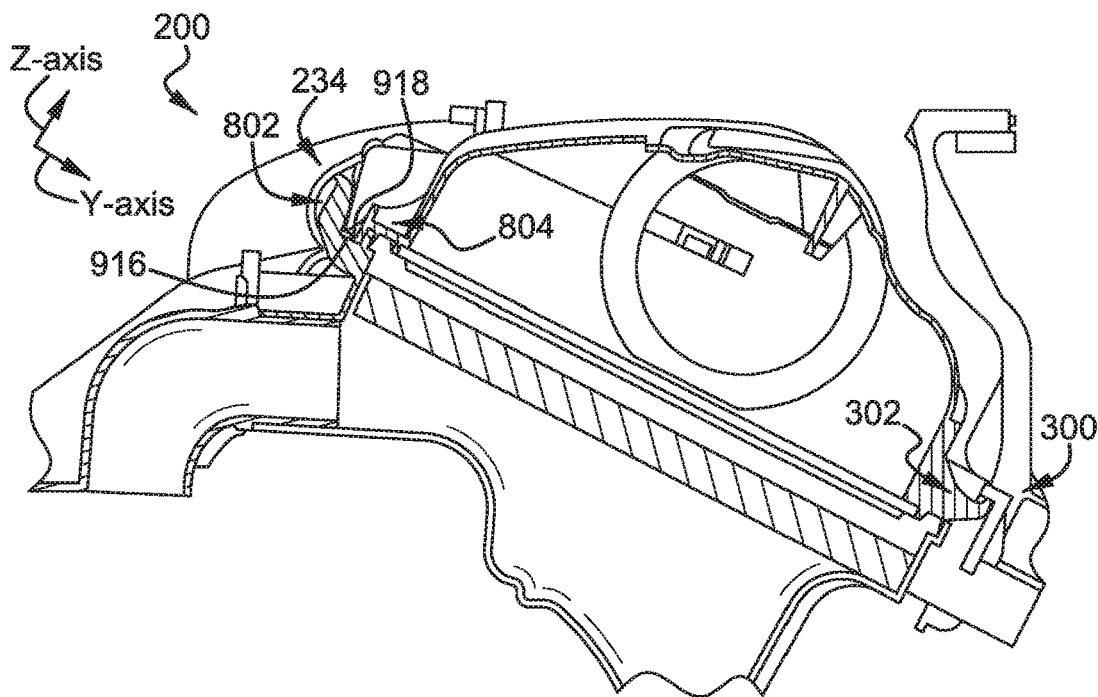

FIG. 11 also shows the planar surface 1100 of the lower housing 226 which extends around the perimeter of the lower housing slated to be in face sharing contact with the planar surface 1102 of the upper housing 224 when the assembly is transitioned into the seated position shown in FIG. 14 from the unseated positioned shown in FIG. 11. The face sharing interaction between the planar surfaces 1100 and 1102 forms the interface 238, shown in FIG. 2.

Figure 12:
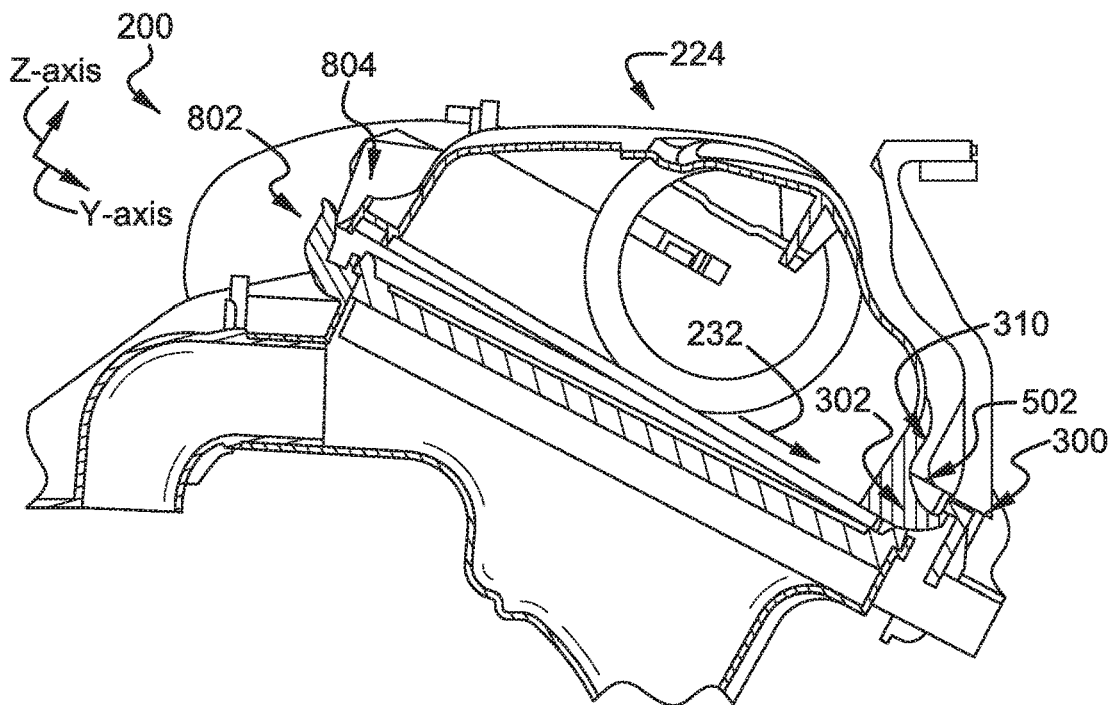

FIG. 12 shows the air cleaner assembly 200 in a partially seated position where the cleat 302 begins to mate with the cleat receptacle 300. Correspondingly, the second guiding member 804 included in the upper housing 224 slides along the upper ramped surface in the ramped surfaces 906 of the first guiding member 802 during the assembly's transition to the seated position. In this way, the guiding members (802 and 804) interact to move the upper housing 224 in the rearward direction 232. The rearward movement pushes the cleat 302 into the cleat receptacle 300. Consequently, the guide feature 228 and the cleat 302 and cleat receptacle 300 work in conjunction to maintain a desired alignment while the assembly is transitioned into the seated position from the unseated position.

FIG. 12 also shows the guide ribs 310 interacting with the alignment projection 502 to provide yet another feature that allows the upper housing 224 and the lower housing 226 to maintain a desired alignment during a transition. The interaction between the guide ribs 310 and the alignment projection 502 moves the upper housing 224 downward and rearward to again allow the cleat 302 and the cleat receptacle 300 to mate in a desired manner.

Figure 13:
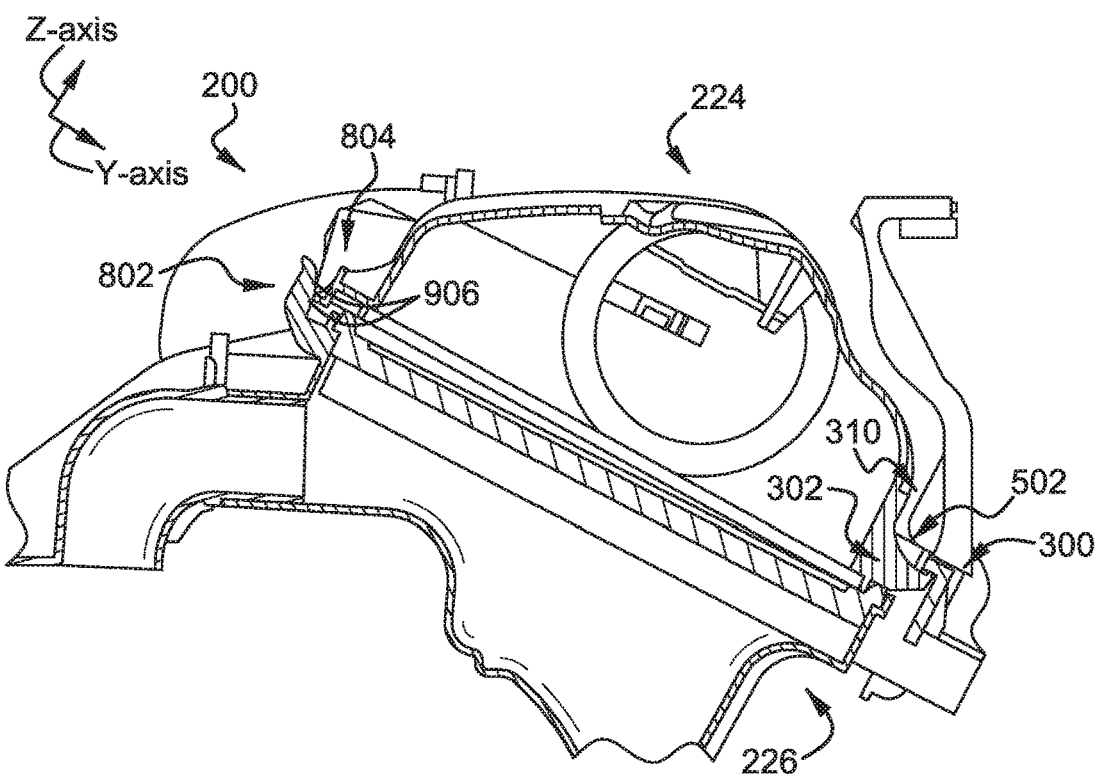

FIG. 13 shows the air cleaner assembly 200 in another partially seated position. As shown, the second guiding member 804 is slid further down the ramped surfaces 906 of the first guiding member 802 again moving the cleat 302 further into the cleat receptacle 300. In particular, the cleat 302 is fully mated with the cleat receptacle 300 in the configuration shown in FIG. 13. The guide ribs 310 are again interacting with the alignment projection 502 to allow the cleat 302 to be fully mated with the cleat receptacle 300. Again, it will be appreciated that a desired alignment between the upper housing 224 and the lower housing 226 continues to be maintained in the configuration of the assembly depicted in FIG. 13.

FIG. 14 shows the air cleaner assembly 200 in the seated positon. In such a position, the cleat 302 is fully mated with the cleat receptacle 300 and the bottom planar surface 916 of the second guiding member 804 is in face sharing contact with the upper surface 918 of the first guiding member 802. Furthermore, the clamps 234 are engaged with the lower housing 226 to provide clamping action between the upper housing 224 and the lower housing 226. It will be appreciated that due to the design of the clamps, the clamping action may only take place in the seated position to reduce the likelihood of improper assembly closure, further increasing the chance of the housing sealing the air filter enclose therein when the assembly is closed. However, in other examples, the assembly 200 may include other combinations of interactive guiding features in the seated position.

FIGS. 15-20 show different embodiments of an air cleaner assembly. It will be appreciated that embodiments of the assembly shown in FIGS. 15-20 may share common structural and/or functional features with the air cleaner assembly shown in FIGS. 2-14. For instance, the embodiments shown in FIGS. 15-20 may include guide features, clamps, cleat receptacles and cleats, etc. Therefore, redundant description of these assembly features are omitted. Furthermore, features from the different embodiments shown in FIGS. 15-20 may also be combined in some instances, if desired.

In each of the embodiments shown in FIGS. 15-20 the air cleaner assemblies include a guide feature with a first guiding member and a second guiding member functioning to direct the upper housing rearward when the assembly is transitioned to a seated position. In such an example, the first guiding member includes an interfacing member coupled to a body of upper housing. The interfacing member also extends in a downward direction toward the lower housing from the upper housing. Continuing with the example, the second guiding member extends outward from the lower housing, in a forward direction perpendicular to the downward direction. Furthermore, the second guiding member is adapted to receive the interfacing member of the first guiding member.

Specifically, FIGS. 15-16 show a second embodiment of an air cleaner assembly 1500. The air cleaner assembly 1500 includes an upper housing 1502 and a lower housing 1504. The upper housing 1502 includes a first guiding member 1506 with an interfacing member 1508 which in this specific embodiment is a ramped flange including a ramped surface 1510. On the other hand, the lower housing 1504 includes a second guiding member 1512 with an extension 1514 and sliding surface 1516. The sliding surface 1516 may slide along the ramped surface 1510 of the ramped flange when the assembly 1500 is transitioned between the unseated and fully seated position. The sliding interaction shifts the upper housing 1502 rearward in direction 1518. The rearward movement may allow the cleats in the assembly to mate with the cleat receptacles to preserve a desired alignment between the upper housing and the lower housing. When opening the air cleaner assembly 1500, the upper housing 1502 is lifted at the front side (shown in FIGS. 15-16) and the ramped surface 1510 rides along the sliding surface 1516 of the second guiding member 1512, between outer rails of the second guiding member 1512, as the upper housing lifts off the seat of the lower housing.

FIGS. 17-18 show a third embodiment of an air cleaner assembly 1700. The air cleaner assembly 1700 includes an upper housing 1702 and a lower housing 1704. The upper housing 1702 includes a first guiding member 1706 with an interfacing member which in this embodiment is a cone 1708. The cone 1708 extends downward from the upper housing 1702 toward the lower housing 1704 and tapers in such a direction. A lower end 1710 of the cone 1708 is also curved (e.g., convex) to allow for smooth mating between the cone and a second guiding member 1712. However, other profiles of the cone may be used in other instances The second guiding member 1712 includes an outwardly extending flange 1714 with an aperture 1716 sized to receive and mate with an outer surface 1718 of the cone 1708. It will be appreciated that the tapered profile of the cone 1708 allows for centering alignment between the upper and lower housing during the transition from the unseated position to the fully seated position. In this way, a desired alignment can again be maintained between the upper and lower housing when the assembly is transitioned to a seated configuration.

In the illustrated example, the cone 1708 includes a vertically arranged surface 1720 that is in face sharing or near face sharing contact with an interior surface 1722 of the outwardly extending flange 1714 in the seated position. Consequently, the relative movement between the cone 1708 and the outwardly extending flange 1714 may be reduced. However, the cone may have a different profile in other embodiments.

FIGS. 19-20 show a fourth embodiment of an air cleaner assembly 1900. Again, the assembly 1900 includes an upper housing 1902, a lower housing 1904, and a guide feature 1906 with a first guiding member 1908 and a second guiding member 1910. The interfacing member of the first guiding member 1908 is an elongated tab 1912 in this embodiment. Furthermore, the second guiding member 1910 includes a flange 1914 extending outward from the lower housing 1904 and including an elongated cavity 1916. The elongated tab 1912 interacts with the elongated cavity 1916 to move the upper housing 1902 in a rearward direction when the assembly is transitioned to the seated position, to maintain sealing alignment in the housing. It will be understood that the rearward movement may allow the cleats to mate with the cleat receptacles at the back side of the assembly 1900.

Furthermore, the elongated cavity 1916 is adapted to received and lock with the elongated tab 1912. For instance, the elongated tab 1912 may be flexible and includes a locking protrusion 1918 that latches under a lower wall 1920 of the elongated cavity 1916. As such, when the assembly 1900 is transitioned into the seated position the elongated tab 1912 may bend inward and slide along an interior surface 1922 of the elongated cavity 1916. Once fully mated, the elongated tab 1912 snaps back to a neutral position where the locking protrusion 1918 engages with the lower wall 1920. Providing this type of locking feature reduces the chance of unintended housing disengagement. The first guiding member 1908 further includes an upper tab 1924 that may function to release the elongated tab 1912 from locking engagement with the elongated cavity 1916.

Further, in some examples, clamps may be omitted from the assembly 1900 due to the locking feature of the guiding member. In this way, the size and complexity of the assembly is reduced which in turn can reduce manufacturing costs and improve assembly packaging. However, in other examples, clamps may be included in the assembly 1900.

The components in the assemblies described herein may be constructed out of suitable materials that may include but are not limited to polymeric materials, metals, etc. In some examples, the components may be constructed out of similar materials. However, in other examples, the material construction between at least some of the components may vary.

FIGS. 1-20 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The technical effect of providing an air cleaner assembly with guide features at the front of the assembly, a cleat and cleat receptacle at the rear of the assembly, guide ribs included in a mounting bracket, and/or clamps that only couple sections of the assembly's housing when the assembly is in a closed position is a reduction in the likelihood of improper air filter alignment during filter installation, replacement, and servicing. The chance of intake system degradation and/or combustion fouling caused by the particulates is consequently diminished, thereby reducing intake system and engine wear and increasing combustion efficiency.

As one embodiment, an air cleaner assembly includes: a tray including a cleat receptacle at a back side of the assembly; a cover including a cleat at the back side; and first and second guiding members arranged at a front side of the assembly, on the tray and cover, respectively, adapted to contact one another continuously and guide the cover rearward, from an unseated position to a seated position where the cleat is seated within the cleat receptacle. In a first example of the assembly, in the unseated position, the cleat is positioned completely outside of the cleat receptacle, wherein the seated position is a fully seated position, and wherein in the fully seated position the first and second guiding members are in face-sharing contact with one another. A second example of the assembly optionally includes the first example and further includes, wherein the cleat receptacle includes a cavity within an outer housing, where an upper wall of the cavity includes a chamfered, outer surface connected to a flat, inner surface and wherein the cleat includes an upward extending fin adapted to slide along the outer surface in transition between the unseated position and the fully seated position and mate with the inner surface in the fully seated position. A third example of the assembly optionally includes one or more of the first and second examples, and further includes one or more clamps attached to a front side of the cover and adapted to be removably coupled to the tray, wherein the first and second guiding members are arranged adjacent to the one or more clamps, and wherein the one or more clamps are adapted to couple to the tray only after the assembly is in the seated position, where the seated position is a fully seated position. A fourth example of the assembly optionally includes one or more of the first through third examples, and further includes, wherein the seated position is a fully seated position and wherein the first and second guiding members maintain contact with one another in each of and between the unseated position and fully seated position and mate with one another in the fully seated position. A fifth example of the assembly optionally includes one or more of the first through fourth examples, and further includes, wherein the first guiding member includes a ramped flange including two angled, ramped surfaces arranged adjacent to one another and the second guiding member includes a mating flange with a bottom, planar surface. A sixth example of the assembly optionally includes one or more of the first through fifth examples, and further includes, wherein the first guiding member further includes a central rib extending outward and away from an outer surface of the first guiding member, the outer surface arranged opposite the two angled, ramped surfaces. A seventh example of the assembly optionally includes one or more of the first through sixth examples, and further includes, wherein the two angled, ramped surfaces are angled, at different angles, relative to a peripheral lip of the tray arranged around at least a portion of an outer perimeter of the assembly and wherein the first guiding member further includes a planar, top surface arranged adjacent to a first one of the two angled, ramped surfaces and parallel with the peripheral lip. An eighth example of the assembly optionally includes one or more of the first through seventh examples, and further includes, wherein the first guiding member includes a ramped flange and the second guiding member includes an extension with a sliding surface adapted to slide along the ramped flange from the unseated to the fully seated position. A ninth example of the assembly optionally includes one or more of the first through eighth examples, and further includes, wherein the first guiding member includes a cone extending downward from the cover and toward the tray and wherein the second guiding member includes an outwardly extending flange including an aperture adapted to mate with outer surfaces of the cone. A tenth example of the assembly optionally includes one or more of the first through ninth examples, and further includes, wherein the first guiding member includes an elongate tab and the second guiding member includes a flange extending outward from the tray and including an elongated cavity adapted to received and lock with the elongated tab. An eleventh example of the assembly optionally includes one or more of the first through tenth examples, and further includes a mounting bracket including a first end coupled to the tray at the back side and a second end adapted to mount to a frame of a vehicle, where the mounting bracket extends along a height of the cover.

As another embodiment, an air cleaner assembly includes: an upper housing including a cleat at a back side of the assembly and a first guiding member at a front of the assembly; a lower housing including a cleat receptacle at the back side and a second guiding member at the front side; and one or more clamps coupled to the upper housing, at the front side, and arranged adjacent to the first and second guiding members, the one or more clamps adapted to be removably coupled to the lower housing when the assembly is in a seated position where planar surfaces of the lower housing and upper housing, around a perimeter of the assembly, are in face-sharing contact with one another and the cleat is seated within the cleat receptacle, the first and second guiding members adapted to continuously interface with one another and guide the assembly from an unseated position to the seated position. In a first example of the assembly, the cleat receptacle extends outward and upward from an outer edge of the lower housing, toward a top of the upper housing, wherein the cleat receptacle includes an enclosed outer housing with a single opening in a side of the cleat receptacle that faces the upper housing, the single opening forming an entrance to a cavity formed within an interior of the cleat receptacle, and wherein an upper, inner surface of the cleat receptacle includes a chamfered, outer surface and a planar surface, the chamfered, outer surface arranged at the entrance to the cavity and angling downward to the planar surface. A second example of the assembly optionally includes the first example and further includes, wherein the cleat extends outward and away from a body of the upper housing and a distal end of the cleat includes an upward extending fin with a planar surface that is adapted to have face-sharing contact with the planar surface of the inner surface of the cleat receptacle when the assembly is in the seated position. A third example of the assembly optionally includes one or more of the first and second examples, and further includes, wherein the first guiding member includes an interfacing member coupled to a body of the upper housing and extends in a downward direction toward the lower housing, wherein the second guiding member extends outward from the lower housing, in a forward direction, and is adapted to receive the interfacing member of the first guiding member, and wherein the forward direction is perpendicular to the downward direction. A fourth example of the assembly optionally includes one or more of the first through third examples, and further includes, wherein the first guiding member includes a mating flange extending outward from the upper housing, the mating flange including a planar surface arranged at a bottom of the upper housing and wherein the second guiding member includes a ramped flange extending outward and upward from the lower housing, the ramped flange including first and second ramp surfaces connected to one another at an angle and a top, planar surface connected to one of the first and second ramp surfaces.

As yet another embodiment, an air cleaner assembly includes: a lower housing including two cleat receptacles spaced apart from one another at a back side of the assembly and two guiding members, each of the two guiding members having an outwardly extending portion and an upwardly extending portion, the upwardly extending portion having a ramped flange having two differently angled ramp surfaces, the two guiding members spaced apart from one another at a front side of the assembly; an upper housing including two cleats spaced apart from one another at the back side and two mating flanges spaced apart from one another at the front side, each of the two mating flanges adapted to slide along a respective one of the two guiding members, along the ramped flange, to guide the upper housing rearward into a seated position where a corresponding one of the two cleats is seated within a corresponding one of the two cleat receptacles; and two clamps coupled to the upper housing, outside of the two mating flanges and adapted to removably couple to receiving members arranged on the lower housing, outward of the two ramped flanges. In a first example of the assembly, in the seated position, a planar surface of the upper housing arranged around a perimeter of the upper housing is in face-sharing contact with a planar surface of the lower housing arranged around a perimeter of the lower housing and wherein the outwardly extending portion of each guiding member extends outward and away from a body of the lower housing, and each upwardly extending portion of each guiding member extends vertically upward from the outwardly extending portion, the upwardly extending portion including a first ramp surface arranged at a first angle relative to the peripheral lip of the lower housing, a second ramp surface arranged at a different, second angle relative to the peripheral lip of the lower housing, and a top, planar surface arranged parallel with the peripheral lip of the lower housing. A second example of the assembly optionally includes the first example and further includes, wherein each of the two cleat receptacles is fully enclosed except for one opening on a side of the cleat receptacle that faces the upper housing, where the cleat receptacle, inside the opening, includes a chamfered, outer surface leading to a planar surface and wherein each of the two cleats includes a distal end with an upwardly extending fin with a planar surface, where an end of the upwardly extending fin including the planar surface is fully enclosed within the cleat receptacle when the assembly is in the seated position.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An air cleaner assembly, comprising:
   a tray including a cleat receptacle at a back side of the air cleaner assembly;
   a cover including a cleat at the back side; and
   first and second guiding members arranged at a front side of the air cleaner assembly, on the tray and the cover, respectively, adapted to contact one another continuously and guide the cover rearward, from an unseated position to a seated position where the cleat is seated within the cleat receptacles;
   wherein in the unseated position the cleat is positioned completely outside of the cleat receptacle, wherein the seated position is a fully seated position, and wherein in the fully seated position the first and second guiding members are in face-sharing contact with one another; and
   wherein the cleat receptacle includes a cavity within an outer housing, wherein an upper wall of the cavity includes a chamfered, outer surface connected to a flat, inner surface, and wherein the cleat includes an upward extending fin adapted to slide along the chamfered, outer surface in transition between the unseated position and the fully seated position and mate with the flat, inner surface in the fully seated position.

2. The air cleaner assembly of claim 1, further comprising one or more clamps attached to a front side of the cover and adapted to be removably coupled to the tray, wherein the first and second guiding members are arranged adjacent to the one or more clamps, and wherein the one or more clamps are adapted to couple to the tray only after the air cleaner assembly is in the fully seated position.

3. The air cleaner assembly of claim 1, wherein the first and second guiding members maintain contact with one another in each of and between the unseated position and the fully seated position and mate with one another in the fully seated position.

4. The air cleaner assembly of claim 3, wherein the first guiding member includes a ramped flange including two angled, ramped surfaces arranged adjacent to one another and the second guiding member includes a mating flange with a bottom, planar surface.

5. The air cleaner assembly of claim 4, wherein the first guiding member further includes a central rib extending outward and away from an outer surface of the first guiding member, the outer surface arranged opposite the two angled, ramped surfaces.

6. The air cleaner assembly of claim 4, wherein the two angled, ramped surfaces are angled, at different angles, relative to a peripheral lip of the tray arranged around at least a portion of an outer perimeter of the air cleaner assembly and wherein the first guiding member further includes a planar, top surface arranged adjacent to a first one of the two angled, ramped surfaces and parallel with the peripheral lip.

7. The air cleaner assembly of claim 3, wherein the first guiding member includes a ramped flange and the second guiding member includes an extension with a sliding surface adapted to slide along the ramped flange from the unseated to the fully seated position.

8. The air cleaner assembly of claim 3, wherein the first guiding member includes a cone extending downward from the cover and toward the tray and wherein the second guiding member includes an outwardly extending flange including an aperture adapted to mate with outer surfaces of the cone.

9. The air cleaner assembly of claim 3, wherein the first guiding member includes an elongate tab and the second guiding member includes a flange extending outward from the tray and including an elongated cavity adapted to received and lock with the elongated tab.

10. The air cleaner assembly of claim 1, further comprising a mounting bracket including a first end coupled to the tray at the back side and a second end adapted to mount to a frame of a vehicle, wherein the mounting bracket extends along a height of the cover.

11. An air cleaner assembly, comprising:
an upper housing including a cleat at a back side of the air cleaner assembly and a first guiding member at a front side of the air cleaner assembly;
a lower housing including a cleat receptacle at the back side and a second guiding member at the front side; and
one or more clamps coupled to the upper housing, at the front side, and arranged adjacent to the first and second guiding members, the one or more clamps adapted to be removably coupled to the lower housing when the air cleaner assembly is in a seated position where planar surfaces of the lower housing and the upper housing, around a perimeter of the air cleaner assembly, are in face-sharing contact with one another and the cleat is seated within the cleat receptacle, the first and second guiding members adapted to continuously interface with one another and guide the air cleaner assembly from an unseated position to the seated position; and
wherein the cleat receptacle extends outward and upward from an outer edge of the lower housing, toward a top of the upper housing, wherein the cleat receptacle includes an enclosed outer housing with a single opening in a side of the cleat receptacle that faces the upper housing, the single opening forming an entrance to a cavity formed within an interior of the cleat receptacle, and wherein an upper, inner surface of the cleat receptacle includes a chamfered, outer surface and a planar surface, the chamfered, outer surface arranged at the entrance to the cavity and angling downward to the planar surface.

12. The air cleaner assembly of claim 11, wherein the cleat extends outward and away from a body of the upper housing and a distal end of the cleat includes an upward extending fin with a planar surface that is adapted to have face-sharing contact with the planar surface of the upper, inner surface of the cleat receptacle when the air cleaner assembly is in the seated position.

13. The air cleaner assembly of claim 11, wherein the first guiding member includes an interfacing member coupled to a body of the upper housing and extends in a downward direction toward the lower housing, wherein the second guiding member extends outward from the lower housing, in a forward direction, and is adapted to receive the interfacing member of the first guiding member, and wherein the forward direction is perpendicular to the downward direction.

14. The air cleaner assembly of claim 11, wherein the first guiding member includes a mating flange extending outward from the upper housing, the mating flange including a planar surface arranged at a bottom of the upper housing and wherein the second guiding member includes a ramped flange extending outward and upward from the lower housing, the ramped flange including first and second ramp surfaces connected to one another at an angle and a top, planar surface connected to one of the first and second ramp surfaces.

15. An air cleaner assembly, comprising:
a lower housing including two cleat receptacles spaced apart from one another at a back side of the air cleaner assembly and two guiding members, each of the two guiding members having an outwardly extending portion and an upwardly extending portion, the upwardly extending portion having a ramped flange having two differently angled ramp surfaces, the two guiding members spaced apart from one another at a front side of the air cleaner assembly;
an upper housing including two cleats spaced apart from one another at the back side and two mating flanges spaced apart from one another at the front side, each of the two mating flanges adapted to slide along a respective one of the two guiding members, along the ramped flange, to guide the upper housing rearward into a seated position where a corresponding one of the two cleats is seated within a corresponding one of the two cleat receptacles; and
two clamps coupled to the upper housing, outside of the two mating flanges and adapted to removably couple to receiving members arranged on the lower housing, outward of the two mating flanges.

16. The air cleaner assembly of claim 15, wherein in the seated position a planar surface of the upper housing arranged around a perimeter of the upper housing is in face-sharing contact with a planar surface of the lower housing arranged around a perimeter of the lower housing and wherein the outwardly extending portion of each guiding member extends outward and away from a body of the lower housing, and each upwardly extending portion of each guiding member extends vertically upward from the outwardly extending portion, the upwardly extending portion including a first ramp surface arranged at a first angle relative to a peripheral lip of the lower housing, a second ramp surface arranged at a different, second angle relative to the peripheral lip of the lower housing, and a top, planar surface arranged parallel with the peripheral lip of the lower housing.

17. The air cleaner assembly of claim 15, wherein each of the two cleat receptacles is fully enclosed except for one opening on a side of the cleat receptacle that faces the upper housing, wherein the cleat receptacle, inside the opening, includes a chamfered, outer surface leading to a planar surface, and wherein each of the two cleats includes a distal end with an upwardly extending fin with a planar surface, wherein an end of the upwardly extending fin including the planar surface is fully enclosed within the cleat receptacle when the air cleaner assembly is in the seated position.

* * * * *